US010664012B1

(12) United States Patent
Zimmerman et al.

(10) Patent No.: US 10,664,012 B1
(45) Date of Patent: May 26, 2020

(54) ACCESSORIES FOR PORTABLE ELECTRONIC DEVICES

(71) Applicant: Apple Inc., Cupertino, CA (US)

(72) Inventors: Aidan N. Zimmerman, Sunnyvale, CA (US); Bradley J. Hamel, San Carlos, CA (US); Christopher J. Stringer, Woodside, CA (US); Markus Diebel, San Francisco, CA (US); Sung-Ho Tan, San Francisco, CA (US); Mikael M. Silvanto, San Francisco, CA (US); Kevin M. Robinson, Sunnyvale, CA (US); Daniel L. McBroom, Leander, CA (US); Michael D. McBroom, Leander, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/053,774

(22) Filed: Aug. 2, 2018

Related U.S. Application Data

(60) Provisional application No. 62/541,537, filed on Aug. 4, 2017.

(51) Int. Cl.
*G06F 1/16* (2006.01)
*F16M 11/38* (2006.01)
*A45C 11/00* (2006.01)

(52) U.S. Cl.
CPC ............ *G06F 1/1632* (2013.01); *A45C 11/00* (2013.01); *F16M 11/38* (2013.01); *G06F 1/1643* (2013.01); *G06F 1/1698* (2013.01); *A45C 2011/002* (2013.01); *A45C 2011/003* (2013.01); *A45C 2200/15* (2013.01); *G06F 1/1626* (2013.01)

(58) Field of Classification Search
CPC combination set(s) only.
See application file for complete search history.

(56) References Cited

U.S. PATENT DOCUMENTS

| 6,353,529 | B1 | 3/2002 | Cies | |
|---|---|---|---|---|
| 7,911,784 | B2 | 3/2011 | Jones | |
| 7,916,468 | B2 * | 3/2011 | Takizawa | F16M 11/105 361/679.41 |
| 8,842,423 | B2 * | 9/2014 | Griffin | G06F 1/1626 248/919 |

(Continued)

FOREIGN PATENT DOCUMENTS

CN 202927395 U 5/2013

*Primary Examiner* — Lisa Lea-Edmonds
(74) *Attorney, Agent, or Firm* — Dickinson Wright RLLP

(57) ABSTRACT

Accessory devices for portable electronic devices are described. An exemplary accessory device can include a first segment coupled to a second segment via a first hinge assembly. The accessory can include a third segment coupled to the second segment via a second hinge assembly such that the second segment is positioned between the first and third segments. The accessory device can be arranged between a closed configuration and a configuration of a stand that supports the portable electronic device at a viewing angle. At the support configuration, the second segment can be at an acute angle relative to the first segment to shift the center of gravity of the system towards the middle. The third segment can be suspended above the first segment and be inclined outwards. The hinge assemblies of the system can be sufficiently stiff to withstand the weight of the electronic device.

20 Claims, 12 Drawing Sheets

(56) References Cited

U.S. PATENT DOCUMENTS

| | | | | |
|---|---|---|---|---|
| 9,382,033 | B2* | 7/2016 | Poon | F16M 13/00 |
| 9,419,670 | B2* | 8/2016 | Fathollahi | H04B 1/3888 |
| 9,451,822 | B2* | 9/2016 | Gu | A47B 23/044 |
| 9,470,356 | B1 | 10/2016 | Zaloom | |
| 9,516,937 | B2* | 12/2016 | Piatt | A45C 13/34 |
| 9,521,226 | B2* | 12/2016 | Ashley | H04M 1/04 |
| 9,532,631 | B2* | 1/2017 | Gu | A45C 11/00 |
| 9,591,905 | B2* | 3/2017 | Poon | F16M 13/00 |
| 9,823,704 | B2* | 11/2017 | Armstrong | G06F 1/1669 |
| 9,826,075 | B2* | 11/2017 | Langhein | H04M 1/04 |
| 9,851,748 | B2* | 12/2017 | Senatori | G06F 1/1616 |
| 9,864,404 | B2* | 1/2018 | Matlin | G06F 1/1626 |
| 9,918,534 | B2* | 3/2018 | Saila | A45C 11/00 |
| 2006/0285283 | A1* | 12/2006 | Simonian | A45C 3/02 |
| | | | | 361/679.55 |
| 2014/0061084 | A1* | 3/2014 | Westrup | A45C 13/02 |
| | | | | 206/472 |
| 2014/0291176 | A1* | 10/2014 | Chung | G06F 1/1656 |
| | | | | 206/45.23 |
| 2014/0291177 | A1* | 10/2014 | Ko | G06F 1/1626 |
| | | | | 206/45.23 |
| 2015/0041341 | A1* | 2/2015 | Marshall | A45C 11/00 |
| | | | | 206/45.2 |
| 2015/0359120 | A1* | 12/2015 | Huang | A45C 11/00 |
| | | | | 206/45.23 |
| 2016/0249472 | A1* | 8/2016 | Tu | A45C 11/00 |
| 2018/0210500 | A1* | 7/2018 | Delpier | G06F 1/1626 |

* cited by examiner

ACCESSORIES FOR PORTABLE ELECTRONIC DEVICES

CROSS-REFERENCE TO RELATED APPLICATIONS

The present application claims the benefit of U.S. Provisional Application No. 62/541,537, entitled "ACCESSORIES FOR PORTABLE ELECTRONIC DEVICES," filed Aug. 4, 2017, which is incorporated herein by reference in its entirety for all purposes.

FIELD

Embodiments described herein generally relate to accessory devices that can be removably coupled with portable electronic devices. More specifically, the described accessory devices can be multi-segment articles that can support portable electronic devices at different inclination angles.

BACKGROUND

Recent advances in computing devices have made portable electronic devices increasingly more prevalent. Users often pair different accessories with their electronic devices to add features and/or to customize their electronic devices. Besides adding functionalities to the electronic devices, accessories can be protective in nature or simply aesthetically pleasing adornments, or in some cases be both protective and ornamental in nature. For example, accessories can be articles such as cases and/or folios. In some cases, while portable electronic devices are often equipped with touch screens, accessories can include input devices such as keyboards to provide additional input options to the users as well as to offer protection to the electronic devices.

SUMMARY

In one aspect, a folio for use with a portable electronic device having a display assembly overlaid by a protective layer is described. The folio may include a base segment having a size and shape in accordance with the portable electronic device. The folio may further include an attachment segment coupled to the base segment, the attachment segment comprising a mechanism capable of securing a rear surface of the portable electronic device to the attachment segment. In some instances, when the portable electronic device is secured to the attachment segment, i) a closed configuration comprises the base segment overlaying the protective layer, and the attachment segment overlaying the rear surface of the portable electronic device; and (ii) a support configuration comprises both the portable electronic device and the attachment segment above the base segment, and the attachment segment balances and supports the portable electronic device.

In another aspect, a folio for use with a portable electronic device is described. The folio may include a base carrying an input device capable of communicating with the portable electronic device. The folio may further include an attachment panel capable of removably coupling with the portable electronic device. The folio may further include a cascading rotational support system having a first rotation element coupled to the base and a second rotation element coupled to the attachment panel such that the cascading rotational support system is capable of suspending the portable electronic device above the base. In some instances, when a first torque is applied to the attachment panel, only the first rotation element rotates until the first rotation element reaches a first hard stop. Further, in some instances, when a second torque opposite the first torque is applied to the attachment panel, only the second rotation element rotates until the second rotation element reaches a second hard stop different from the first hard stop.

In another aspect, folio for removably coupling to a portable electronic device is described. The folio may include a folio removably coupled to the portable electronic device. The folio may include a first segment carrying an input device that is capable of communication with the portable electronic device. The folio may further include a second segment pivotally coupled to the first segment. The folio may further include a third segment pivotally coupled to the second segment. The third segment is capable of being removably coupled to the rear surface of the portable electronic device. In some instances, in a support configuration, the folio supports the portable electronic device, the second segment is at an acute angle with respect to the first segment and the portable electronic device and the third segment are suspended above the first segment. Also, in some instances, in a closed configuration, the first segment covers an entirety of the display assembly.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

Figure 1:
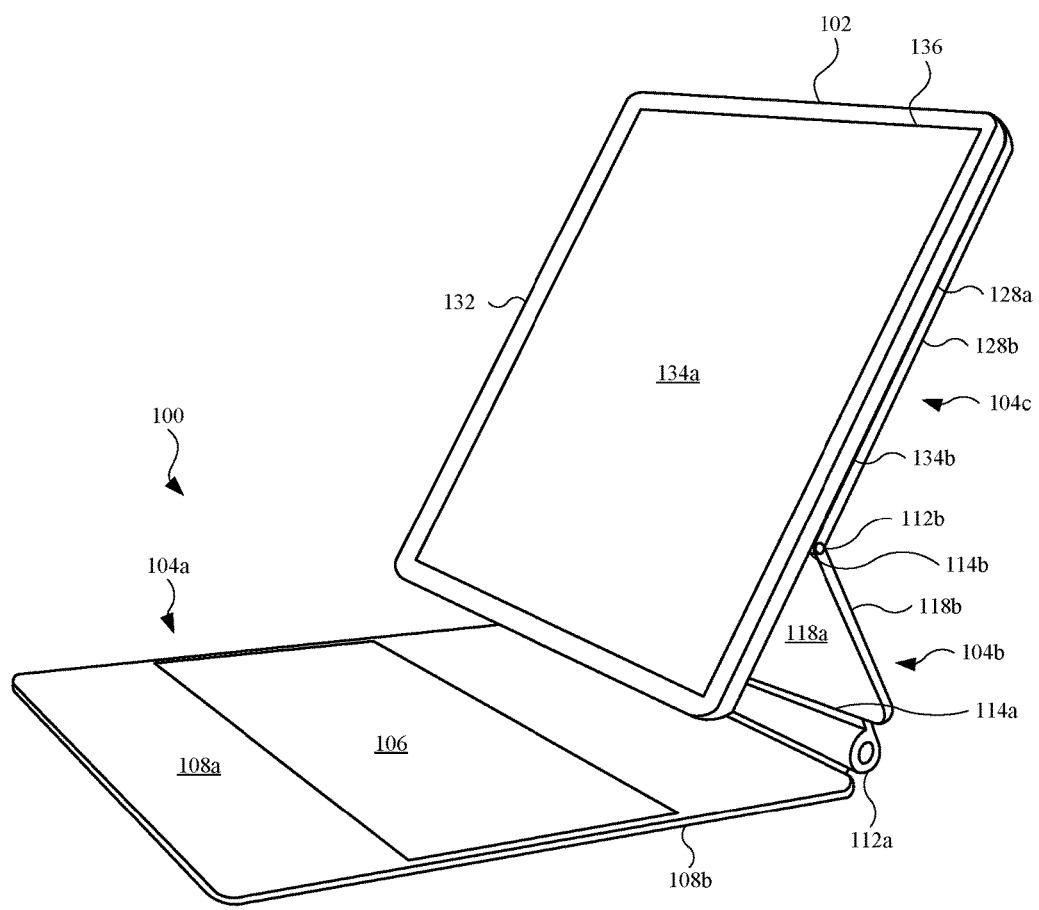
FIG. 1 illustrates an isometric view of an electronic system that can include an accessory article and a portable electronic device, in accordance with some embodiments.

Those skilled in the art will appreciate and understand that, according to common practice, various features of the drawings discussed below are not necessarily drawn to scale, and that dimensions of various features and elements of the drawings can be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; other embodiments may be used, and changes may be made without departing from the spirit and scope of the described embodiments.

Accessory devices such as cases and covers can often be coupled with portable electronic devices to provide added benefits to the portable electronic devices such as in the form of protection and improved appearance. While portable electronic devices are often handheld by the users, the portable electronic devices can also be placed on surfaces such as tables in situations such as when users watch videos with the portable electronic devices or when users connect external input devices such as accessory keyboards to the portable electronic devices and use the portable electronic devices primarily as displays. In those situations when portable electronic devices are placed on surfaces, it is often desirable to have a portable electronic device inclined relative to the surface to provide better viewing angles for the users.

Some accessory devices can be arranged in certain configurations to support the rear surface of the portable electronic device so that users do not need to manually hold the portable electronic device at inclination angles (corresponding to the viewing angles). However, designing an accessory device as a stand for a portable electronic device can be challenging. Because of its internal components and display assembly, the portable electronic device can often be heavier than the accessory device. As such, it can often be difficult to balance the portable electronic device by the accessory device because the lighter (and sometimes also smaller) accessory device is required to support the heavier portable electronic device. Conventional accessory devices are often designed with configurations that sacrifice flexibilities in order to provide balance to the systems. For example, conventional accessory devices may only allow a single or a very limited number of possible inclination angles of the portable electronic device so that the selectable view angles are limited and often fixed.

Embodiments described herein relate to accessory articles that can support portable electronic devices (tablet computers, mobile phones, etc.) at inclination angles and at the same time can allow the inclination angles to be finely adjusted. Some exemplary accessory articles described herein can take the form of a multi-segmented folio that can, in a closed configuration, cover both the front and rear surfaces of a portable electronic device. The article can be re-arranged into a configuration of a stand (sometimes referred to as a "support configuration") that can be brought behind the portable electronic device to support the portable electronic device at an inclination angle.

In terms of the structure, in some instances, an exemplary accessory article can include a first segment that can carry an input device such as a keyboard that can be controlled by a user to input commands to the portable electronic device. The accessory article can also include a second segment that can be coupled to the first segment via a first hinge assembly. The accessory article can further include a third segment that can carry attachment components for removably attaching the portable electronic device to the third segment. The third segment can be coupled to the second segment via a second hinge assembly. In this regard, the second segment can be positioned between the first and third segments. In a closed configuration, the first segment can cover a first surface of the portable electronic device while the second and third segments can cooperate to cover a second surface of the portable electronic device opposite the first surface. In a support configuration, the first segment can become a base of the entire system (i.e. the system having the accessory article and the portable electronic device). The second segment can be inclined inward and at an acute angle relative to the first segment. The third segment can be suspended above the first segment and be inclined outward.

In this support configuration, the input device, such as a keyboard, can positioned be on the base of the system. At the same time, the portable electronic device, which can be carried by the third segment, can be suspended above and inclined with respect to the input device. Hence, the system in this configuration can be similar to a laptop computer. In addition, the second hinge assembly that controls the orientation of the third segment can be finely adjusted to change the viewing angle of the portable electronic device. Also, because of the presence of the second segment that inclines towards the first segment, the center of gravity of this system can shift more towards the middle of the system, thus creating an equilibrium state. An equilibrium state of the system can refer to a balanced and static state in which the components of the system, without any external support or any external force, remain stationary relative to each other.

Exemplary accessory articles in accordance with some embodiments can include various mechanical features that further facilitate the balance in the support configuration. For example, the hinge assemblies of the accessory articles can have one or more hard stops. A hard stop can be associated with a maximum or minimum angle that a hinge assembly can rotate turn. At a hard stop, a rotatable part of the hinge assembly may encounter a stationary part (such as pressing against a wall) so that no further movement is allowed. The first hinge assembly, which connects the first and second segments, may include a hard stop at an acute angle. This hard stop can ensure that the second segment is limited to a position defining an acute angle relative to the first segment so that, in any support configurations, the second segment can always shift weight of the system inwards towards the middle of the system. The second hinge assembly, which connects the third segment carrying the portable electronic device, can also have one or more hard stops that limit the range of the inclination angle of the portable electronic device. For example, the second hinge assembly can have a hard stop that prevents the portable electronic device from turning to an orientation that is parallel relative to the first segment. It should be noted, however, the inclination angle can be finely adjusted within a range of angles.

To further support an equilibrium state of a support configuration, the hinge assemblies can also have stiffness that can withstand the weight of the portable electronic device. The stiffness of a hinge assembly can be associated with the torque friction of the hinge assembly. The torque friction of a hinge assembly can be the minimum torque required to overcome the friction of the hinge assembly to rotate the hinge assembly. A hinge assembly can have one or more torque components such as a friction clip that generate torque in favor of or against movement. For a support configuration, each hinge assembly of the accessory article needs to withstand the weight of a load, which can be a combination of the weights of one or more segments and/or the portable electronic device. The load can exert a torque that is roughly equal to a perpendicular component of the weight of the load multiplied by the distance between the center of gravity of the load and the hinge assembly. To maintain a support configuration in an equilibrium state, each hinge assembly can have a torque friction that can be larger than the expected maximum torque exerted by a load. In other words, each hinge assembly can be sufficiently stiff to withstand the weight of the system or part of the system so that the hinge assembly will not turn unless an external force (such as an applied force by a user) is exerted to the system.

The hinge assemblies in some exemplary accessory articles can also cooperate to form a cascading rotational support system. A cascading rotational support system can refer to two or more rotational supports that are related or connected to each other based on certain qualities and/or turn orders. For example, the hinge assemblies can have asymmetrical torque frictions (i.e. having different torque frictions in different rotational directions) that are related to other hinge assemblies. For the ease of reference, the turn direction from the closed configuration to the support configuration may be referred to as a first direction. The opposite turn direction from the support configuration to the closed configuration may be referred to as the second direction. In some configurations, the first hinge assembly can have a torque friction that is less than that of the second hinge assembly in the first direction. However, in some configurations, the first hinge assembly can have a torque friction that is greater than that of the second hinge assembly in the second direction. This arrangement can allow a particular turn order between the first and second hinge assemblies. When the accessory article is turned from the closed configuration to the support configuration, the first hinge assembly, being easier to rotate due to its relatively lower torque friction, can rotate first (before the second hinge assembly rotates) until the first hinge assembly reaches the aforementioned hard stop. After the first hinge assembly reaches the hard stop, the second hinge assembly can subsequently rotate back and forth to finely adjust the inclination angle of the portable electronic device without moving the first hinge assembly. This is due in part to the first hinge assembly reaching a hard stop in the first direction and also the first hinge assembly being having a relatively higher torque friction than the second hinge assembly in the second direction. This arrangement of asymmetrical torque frictions can facilitate a convenient adjustment of the viewing angle of the portable electronic device because the first hinge assembly can remain stationary when the viewing angle (which is largely associated with the second hinge assembly) is adjusted.

Accessory articles in accordance with some embodiments described herein can also include other mechanical or electronic features that provide additional benefits to the portable electronic devices. As non-limiting examples, first, a hinge assembly of an accessory article can have an elongated hollow body that can serve as a retainer to receive a digital pen such as a stylus or another interactive tool that can be used with the portable electronic device. Second, a segment of some exemplary accessory articles can be less stiff than other segments and can include two structural layers sandwiching a viscoelastic material that promotes a dampening of the vibration of the system. Third, an exemplary accessory article can include a relatively large segment (as compared to other smaller segments) that can have a size and shape generally in accordance with the portable electronic device. Some of the smaller segments can be connected to one or more hinge assemblies that allow the smaller segments to be folded on top of each other. In some configurations, the body of the portable electronic device can largely overlay the relatively large segment and the stacked smaller segments can be position at one end of the portable electronic device to make the device slightly inclined. Hence, this configuration can allow the accessory article to serve like a clipboard for the portable electronic device. Fourth, an exemplary accessory article can include battery packs that can store and transfer power to the portable electronic device. Fifth, an exemplary accessory article can include external connection ports (e.g. Universal Serial Bus, or "USB") that allow wired transfer of information and power between the portable electronic device and an external device via the accessory article.

These and other embodiments are discussed below with reference to FIGS. 1-10. However, those skilled in the art will readily appreciate that the detailed description given herein with respect to these figures is for explanatory purposes only and should not be construed as limiting.

FIG. 1 illustrates an isometric view of an electronic system that can include an article 100 and an electronic device 102, in accordance with some embodiments. It should be noted that the article 100 may sometimes be referred to as an accessory, an accessory unit, an accessory device, accessory segment, folio, stand, support etc. As shown, the article 100 is coupled with the electronic device 102. However, the coupling may include a removable coupling such that the electronic device 102 may be removed, or separated from, the article 100 without damaging the article 100 and the electronic device 102. Also, the article 100 may include a multi-segmented article. The segments in article 100 could sometimes be referred to panels. As it will be discussed in further detail below, the article 100 can be arranged and re-arranged into different configurations for different purposes. In one case, the article 100 can define both a support configuration (also referred to as a first configuration) as well as a closed configuration (also referred to as a second configuration). The closed configuration may provide protection for the electronic device 102. In the particular configuration shown in FIG. 1, the article 100 takes the form of a stand that supports (thereby defining at least one form of a support configuration) the electronic device 102 at an inclination angle to provide a better viewing angle for users.

The article 100 can include a first segment 104a, which can sometimes also be referred to as an input segment or a base due to the first segment 104a carrying an input device(s) 106 on an interior surface 108a of the first segment 104a that is opposite an exterior surface 108b (of the first segment 104a). The input device 106 can communicate with and provide input commands to the electronic device 102. The input device 106 can take the form of a keyboard, a track pad, a touch-sensitive display, a scanner, any other suitable input devices, and/or any combinations thereof. The article 100 can include a second segment 104b that is pivotally coupled to the first segment 104a via a first hinge assembly 112a. The first hinge assembly 112a may include a rotational element. As shown, the first hinge assembly 112a is located at a first edge 114a of the second segment 104b. The second segment 104b can include an interior surface 118a and an exterior surface 118b that is opposite the interior surface 118a. The article 100 can include a third segment 104c that is pivotally coupled to the second segment 104b via a second hinge assembly 112b. The second hinge assembly 112b may include a second rotational element at a second edge 114b of the second segment 104b. The third segment 104c can include an interior surface 128a, to which the electronic device 102 can removably attach, and an exterior surface 128b opposite the interior surface 128a. Because the electronic device 102 can be removably attached to the third segment 104c, the third segment 104c can sometimes be referred to as an attachment segment, an attachment panel, a back cover, a support, and/or a support segment. Also, the second segment 104b can sometimes be referred to as an intermediate segment because it is positioned between the first segment 104a and the third segment 104c. By rotating the segments, the article 100 can be arranged into different configurations. This will be shown and described below. It should be understood that the article 100 could include other components, some of which will be discussed in more detail. Also, while the first hinge assembly 112a and the second hinge assembly 112b are described as hinge assemblies, those skilled in the art would understand that the hinge assemblies do not have to be hinge assemblies. The first hinge assembly 112a and the second hinge assembly 112b can be any suitable hinge assemblies.

The segments described herein can each include internal structural components such as frames and/or plates formed from rigid materials such as metals (e.g. aluminum), alloys, reinforced polymers, other suitable materials, and/or any combinations thereof to provide the structural rigidity to the segments. The internal structural elements can be mounted or connected to the first hinge assembly 112a and/or the second hinge assembly 112b. The segments can also include other internal components such as circuitry that can be used for different purposes including communication with the electronic device 102. The internal components can be wrapped with any suitable materials. In one case, the external enclosure can be formed from flexible materials such as fabrics, leathers, rubbers, silicone, other flexible plastic, other flexible polymers, or any suitable combination thereof. In another case, the external enclosure can be formed from more rigid materials such as high-density polyvinyl chloride, high-density polycarbonate, high-density polyethylene, carbon fiber, fiberglass, metal (e.g., aluminum), wood, any other suitable materials, or any combination thereof. Some of the materials of the external enclosure, especially for the third segment 104c, can be radio-transparent materials so that the materials do not block the radio transmission and reception of the electronic device 102. In some cases, the enclosures of different segments can be formed from the same materials to give a coherent appearance to the article 100. In other cases, the enclosures for different segments can be formed from different materials to provide contrasting appearance among the segments of the article 100.

The hinge assemblies described herein can be any types of suitable hinges such as friction hinges and detent hinges. Some hinge assemblies can include conventional clutch mechanisms while other hinges can be of more specific types such as layered friction hinges, yoga geared hinges, or any other suitable hinges. The first hinge assembly 112a and/or the second hinge assembly 112b in the article 100 can have specific stiffness and torque friction so that article 100 can withstand the weight of electronic device 102 and statically maintain the configurations of article 100, such as when article 100 is in a support configuration shown in FIG. 1. The first hinge assembly 112a and/or the second hinge assembly 112b described herein can also include spring loaded hinges, or can include torsion bars so that the torque required to turn the hinge assemblies can vary based on the angles of the hinge assemblies and the directions of the turning. In addition, the first hinge assembly 112a and/or the second hinge assembly 112b described herein can also include certain angular limits so that the two segments coupled with the first hinge assembly 112a or the second hinge assembly 112b can only be rotated within a certain angular range. Different hinge assemblies in the article 100 can have different properties in terms of the stiffness, torque, angular limit, and etc. Detailed properties of the hinge assemblies in the article 100 will be discussed below.

Referring to the electronic device 102, the electronic device 102 may include a portable electronic device such as a tablet computer or a smart phone. The electronic device 102 can include a housing 132, or enclosure, and may include a front surface 134a (or first surface) and a rear surface 134b (or second surface). The front side of the housing 132 can have edges that define an opening at which a display assembly 136 is carried. The display assembly 136 may present visual information, in the form of still images and/or videos. The display assembly 136 can include a capacitive touch sensitive layer designed to receive a touch input to alter the visual information. Also, the electronic device 102 can include a protective layer that overlays the display assembly 136. The protective layer can include a transparent material, such as glass or sapphire, as non-limiting examples.

Figure 2A:
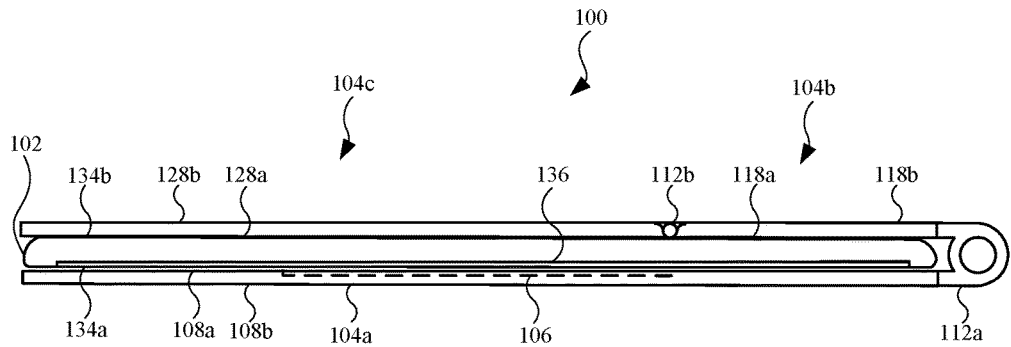
FIG. 2A illustrates a side view of the electronic system shown in FIG. 1, showing the system a closed configuration.
Figure 2B:
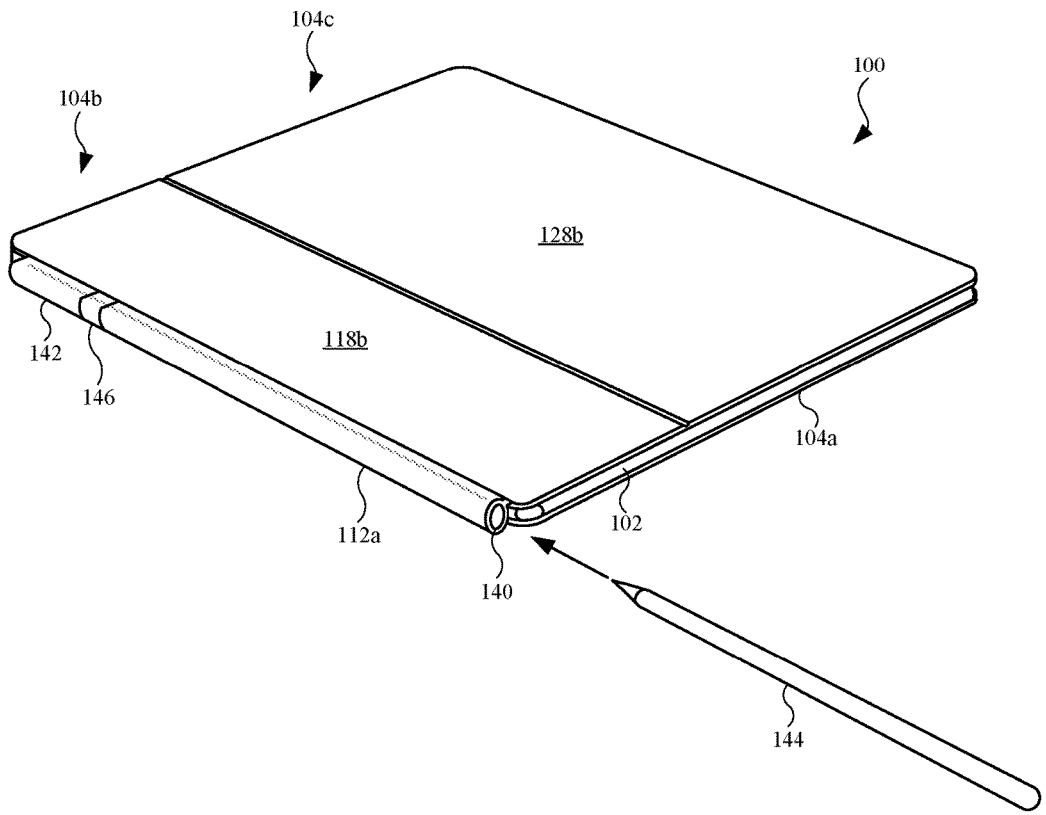
FIG. 2B illustrates an isometric view of the electronic system shown in FIG. 2A, further showing a digital pen.

Referring to FIGS. 2A and 2B, a side view and an isometric view, respectively, of a closed configuration of the article 100 covering the electronic device 102 are illustrated. In the closed configuration, the electronic device 102 can be sandwiched between the segments of the article 100 so that the article 100 can provide protection and/or improve the appearance of the electronic device 102. The first segment 104a may include a size and shape generally in accordance with the electronic device 102 and can cover the front surface 134a of the electronic device 102. In other words, the first segment 104a can generally overlay the front surface 134a of the electronic device 102 and cover the entirety of display assembly 136 so that the input device 106, located on the interior surface 108a of the first segment 104a, can be in a close proximity to the display assembly 136 while the exterior surface 108b of the first segment 104a can be the external facing surface, as shown in FIG. 2A. In some embodiments, the first segment 104a can be of sufficient size to cover the front surface 134a of the electronic device 102 in its entirety.

The second segment 104b and the third segment 104c can be smaller than the first segment 104a. However, when combined, the second segment 104b and the third segment 104c can also have a size and shape generally in accordance with the electronic device 102. In other words, the combined surface area of the second segment 104b and the third segment 104c is about the same as the area of the first segment 104a. Hence, the second segment 104b and the third segment 104c can cooperate to overlay the rear surface 134b the electronic device 102 when the second segment 104b and the third segment 104c are planar to each other, as shown in FIG. 2A. Accordingly, the interior surface 118a of the second segment 104b and the interior surface 128a of the third segment 104c can overlay the rear surface 134b. However, the rear surface 134b may extend beyond the aforementioned interior surface individually. Also, although not shown, the third segment 104c can include a mechanism that is capable of securing the rear surface 134b to the interior surface 128a of third segment 104c. In the closed configuration, the interior surface 118a of second segment 104b and the interior surface 128a of third segment 104c can be in a close proximity to the rear surface 134b. The exterior surface 118b of the second segment 104b and the exterior surface 128b of the third segment 104c can be the external facing surfaces, as shown in FIG. 2A. Also, in a closed configuration, the first segment 104a can be in a rotational relationship with respect to the second segment 104b and the third segment 104c, allowing the first segment 104a to generally overlay a protective layer (not shown in FIGS. 2A and 2B) of the electronic device 102.

Referring specifically to FIG. 2B, the first hinge assembly 112a can include a retainer that can retain another accessory device (e.g. a digital pen) for use with the electronic device 102. For example, the first hinge assembly 112a may include a hollow body that can include an opening 140 at one end and internal components 142, such as bushings, cams, bearings and springs, at a second (opposite) end. The hollow body of the first hinge assembly 112a can serve as a retainer that can receive a digital pen 144. If the digital pen 144 requires power to operate, the first hinge assembly 112a can additionally include a charger 146 near the second end of the first hinge assembly 112a. However, other locations along the first hinge assembly 112a are possible. It should be noted that while a retainer for the digital pen 144 is shown to be the body of the first hinge assembly 112a, a retainer for the digital pen 144 could also be in other forms and/or be located at other locations. In some cases, both the digital pen 144 and the article 100 can include magnetic elements so that the digital pen 144 can be removably attached to the article 100 through magnetic coupling. For example, the digital pen 144 can include a magnet and the segments of the article 100 can include ferromagnetic material such as a ferromagnetic metal. Hence, the digital pen 144 can be attached to any segments of the article 100.

Figure 3:
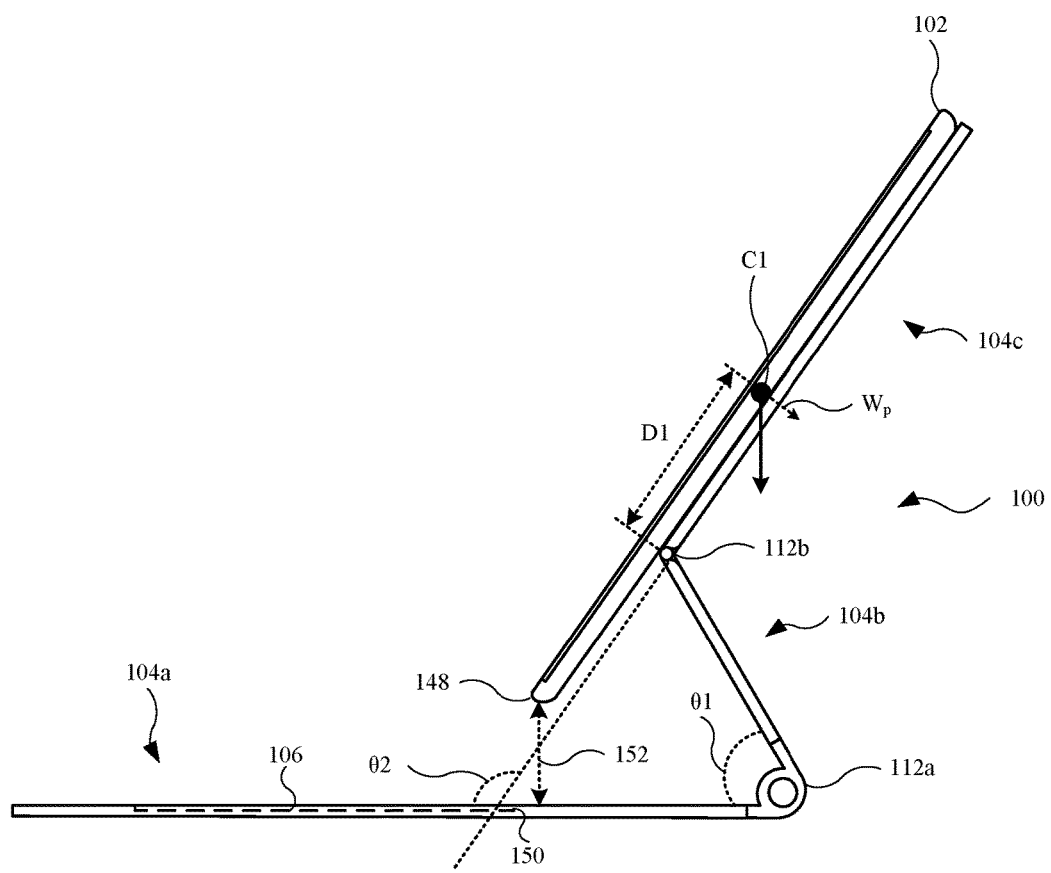
FIG. 3 illustrates a side view of a support configuration of the article carrying the electronic device.

FIG. 3 illustrates a side view of a support configuration of the article 100 carrying the electronic device 102. This configuration can resemble a configuration of a laptop computer in which the first segment 104a carrying the input device 106 can serve as a base potion while the electronic device 102 can serve as a display portion. Due in part to the second hinge assembly 112b positioned between the second segment 104b and the third segment 104c, the user can adjust the viewing angle of the electronic device 102.

In this configuration, the article 100 and the electronic device 102 can be in an equilibrium state, meaning the segments and the electronic device 102 are at a balanced and static state without additional support or external force. In this state, the second segment 104b can be at an acute angle relative to the first segment 104a, as denoted by angle θ1. Hence, second segment 104b is inclined and elevated relative the first segment 104a. It should be understood that the angle θ1 is less than 90 degrees. The inward inclination of the second segment 104b, due to the acute angle, can shift the center of gravity of the system inwards so that the entire system can achieve equilibrium. In one specific embodiment, at this equilibrium state, the electronic device 102 is only attached to and supported by the third segment 104c. Moreover, in that specific embodiment, the third segment 104c is only supported by second segment 104b. Also, the second hinge assembly 112b can support and suspend the third segment 104c and the electronic device 102 so that the third segment 104c can be further elevated from the second segment 104b and inclined away from the first segment 104a. In this manner, the third segment 104c can be at an obtuse angle relative to the first segment 104a, as denoted by an angle θ2. It should be understood that the angle θ2 is between 90 and 180 degrees. Also, a lower edge 148 of the electronic device 102 can align with a top edge 150 of the input device 106.

As shown in FIG. 3, the electronic device 102 can be suspended (i.e. elevated) from the first segment 104a such that the electronic device 102 is separated from the first segment 104a by a gap 152. In this manner, the electronic device 102 is not restricted at any point other than at the second hinge assembly 112b. As a result, the viewing angle of the electronic device 102 can be more readily and easily adjusted. Also, due in part to the elevation of the electronic device 102, the viewing position of the electronic device 102 may be enhanced for a user, as the electronic device 102 is closer to the user (as opposed to the electronic device 102 resting on the first segment 104a. However, in other embodiments (not shown in FIG. 3), the lower edge 148 of the electronic device 102 can be in contact with the first segment 104a to provide additional support of the electronic device 102. In this case, article 100 may include a stop at a location corresponding to the contact position between the first segment 104a and the electronic device 102. The stop can fix the position of the electronic device 102 relative to the first segment 104a.

The hinge assemblies (i.e., rotational elements) of the article 100 may include a specific stiffness that can withstand the weight of the segments and the electronic device 102. The stiffness of a hinge assembly can be described in terms of the torque friction (i.e. minimum torque required) to turn the hinge assembly in one direction.

A hinge assembly can provide a constant and/or variable torque depending on specific design and user considerations. For example, when the design requires that one segment of the article retains a fixed position, or angular displacement, relative to another segment in a support configuration, the hinge assembly can provide an overall hinge assembly torque that can balance a torque generated by a load in the support configuration. Accordingly, the hinge assembly can include a number of torque generating components, each of which provide a torque Ti that combine to provide the overall hinge assembly torque in accordance with Equation (1) below. Equilibrium requires that hinge torque $\tau_{hinge}$ be equal to or greater than a maximum value of the torque $\tau_{load}$ of the load.

$$\tau_{hinge} = \Sigma_1{}^n \tau_1 \geq \tau_{load} \qquad \text{Eq (1)}.$$

It should be noted that the hinge assembly can include a constant torque component, such as a friction clip, that engages a rotational component (such as a shaft) with frictional force $F_f$ applied at a surface of the rotational component a distance $r_s$ from an axis of rotation resulting in constant torque $\tau_{const}$ according to Equation (2):

$$\tau_{const} = F_f * r_s \qquad \text{Eq. (2)}.$$

Moreover, the hinge assembly can also include a variable torque component such as a torsional element (or spring element) that provides a torque in accordance with the angular displacement (θ) of the base that can provide variable torque $\tau_{var}$ in accordance with Equation (3):

$$\tau_{var} \propto \varphi \qquad \text{Eq. (3)}$$

where φ represents a twist angle from an equilibrium position. In this way, by combining the various torque components, each of the first hinge assembly 112a and the second hinge assembly 112b can be customized to provide a torque profile in accordance with the specific design and kinematic requirements of the article 100.

In a particular case, the torque of a load $\tau_{load}$ can be related to a perpendicular component of the weight W of the load relative to a pivotal point (e.g. an axis of rotation of a hinge assembly) multiplied by the distance D between the center of gravity of the load and the pivotal point in accordance to Equation (4) below. The center of gravity of a load can depend on the relative weights, sizes and dimensions of the components (e.g. segments of the article 100 and/or the electronic device 102) of the load.

$$\tau_{lid} = W_{perpendicular} * D \qquad \text{Eq. (4).}$$

For example, FIG. 3 is labeled with a center of gravity C1 of the total of the electronic device 102 and the third segment 104c. The location of the center of gravity C1 is exemplary only because the location can depend on the relative weights, sizes and dimensions of the segments and the electronic device 102. In this particular orientation, the torque exerting on the second hinge assembly 112b by a load (which can be the total of the weight of the electronic device 102 and the third segment 104c in this particular case) can be equal to a perpendicular component (labeled by arrow $W_p$) of the weight of the load multiplied by the distance D1 between the center of gravity C1 and the second hinge assembly 112b. However, it should be noted that the perpendicular component $W_p$ of the weight of the load is variable because the third segment 104c is rotatable relative to second segment 104b so that the second hinge assembly 112b can experience different amounts of torque from the load based on different orientations of the third segment 104c. To maintain the entire system in the equilibrium state, the second hinge assembly 112b can have a torque friction that is greater than a maximum torque exerted by the load, which can be greater than the torque exerted by the load at the orientation illustrated in FIG. 3 because it can reasonably be expected that a user might lift the entire system and put the system at different orientations. The torque friction the third segment 104c should be sufficiently large such that the system can remain stationary at any orientation. In some cases, the torque friction can be at least equal to the total weight of electronic device and the third segment 104c multiplied by distance D1. In other cases, the torque friction can be significantly greater than the maximum torque exerted by the load so that the entire system can be relatively stiff. Hence, without any external force, such as a force by a user turning the segments, the article 100 supporting the electronic device 102 can maintain stationary at the configuration shown in FIG. 3.

Similarly, the first hinge assembly 112a can also have a stiffness that can withstand the torque exerting on the first hinge assembly 112a by the weight of the electronic device 102, the third segment 104c, and second segment 104b combined. By having hinge assemblies that are stiff, the article 100 can maintain the configuration shown in FIG. 3 in an equilibrium state.

Figure 4A:
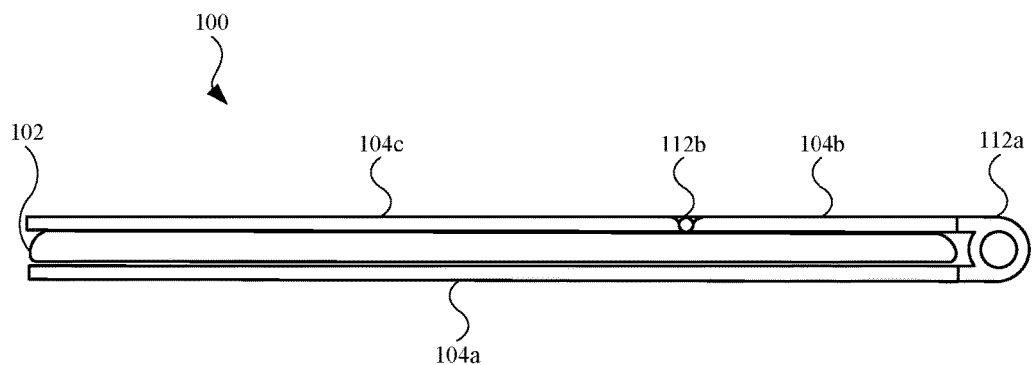
FIG. 4A-4C illustrate a transition of the electronic system from a closed configuration to a support configuration.
Figure 4B:
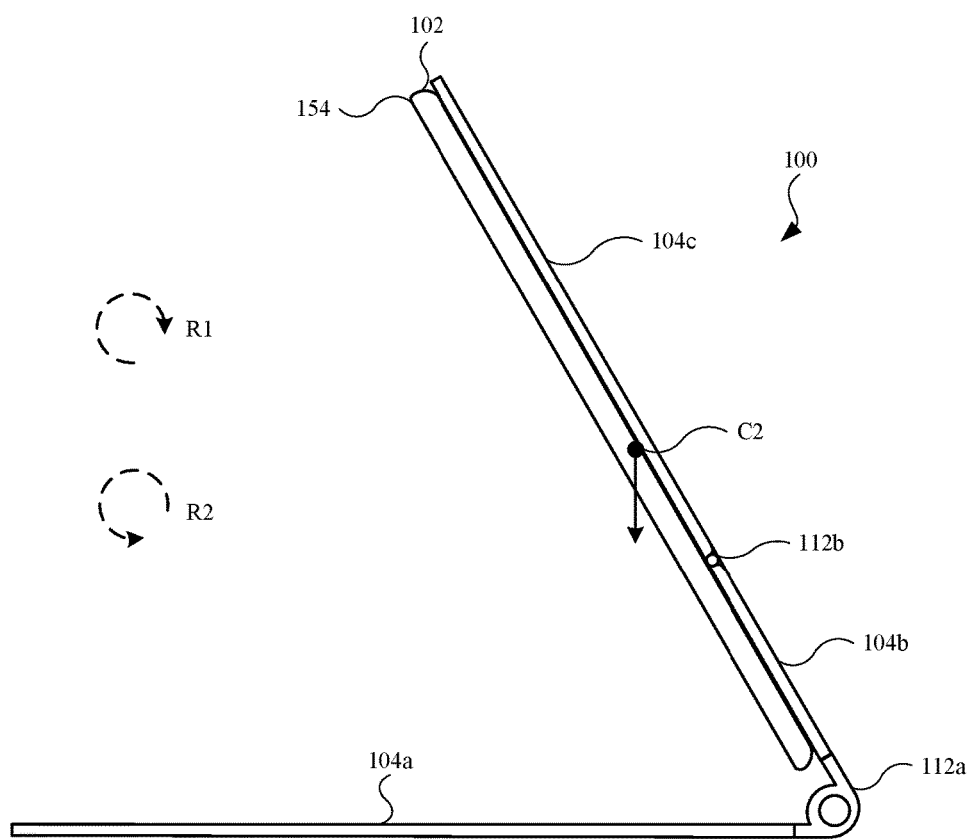
Figure 4C:
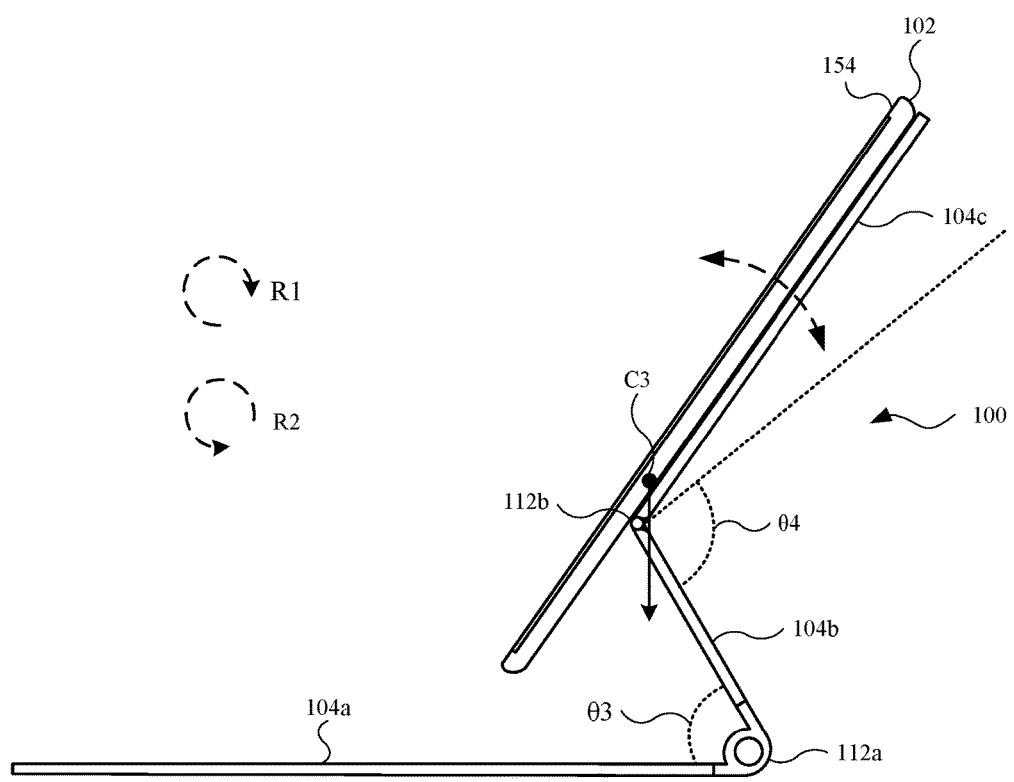

FIGS. 4A-4C illustrate the rearrangement from a closed configuration of the article 100 to a support configuration. The closed configuration of the article 100 shown in FIG. 4A can first be turned to a V-shaped intermediate configuration shown in FIG. 4B by turning the first hinge assembly 112a to rotate the second segment 104b together with the third segment 104c away from the first segment 104a (i.e. in a direction R1). At the intermediate configuration shown in FIG. 4B, the second segment 104b and the third segment 104c can be planar to each other and both segments can be at an acute angle relative to the first segment 104a. At this state, a center of gravity C2 of the total of the electronic device 102, the second segment 104b, and the third segment 104c can be near the midpoint of the electronic device 102. The first hinge assembly 112a should have a stiffness that can withstand the torque exerted by the total weight of the electronic device 102, the second segment 104b, and the third segment 104c. From the intermediate configuration in FIG. 4B to the support configuration in FIG. 4C, the second hinge assembly 112b can then be turned in the direction R1 to further rotate the third segment 104c away from the first segment 104a until the third segment 104c is at a right angle or an obtuse angle relative to the first segment 104a. In the entire transition from the closed configuration to the support configuration, the electronic device 102 can retain the article 100.

The first hinge assembly 112a and the second hinge assembly 112b may include features that facilitate the transition of the article 100 and maintain the support configurations of the article 100. As shown in FIG. 4C, the first hinge assembly 112a may limit the angle between the first segment 104a and the second segment 104b to an angle θ3, which may include an acute angle. When the first segment 104a and the second segment 104b are separated by the angle θ3, a rotational part of the first hinge assembly 112a meets a hard stop (such as pressing against a wall) so that the second segment 104b cannot go beyond the angle θ3 in a direction R1. In other words, the first hinge assembly 112a may include an angular range of motion less than 90 degrees (corresponding to the angle θ3) such that the second segment 104b is only rotatable relative to the first segment 104a at an angle that is less than 90 degrees. The angular limit of the first hinge assembly 112a can serve at least two purposes. First, the angular limit can allow the article 100 to naturally transition from the V-shaped intermediate configuration shown in FIG. 4B to the support configuration shown in FIG. 4C. After the second segment 104b and the third segment 104c turn together away from the first segment 104a (in the direction R1) and reach the angular limit of first hinge assembly 112a, the only hinge that is rotatable in the same direction is the second hinge assembly 112b. In this regard, the second hinge assembly 112b can start to turn after first hinge assembly 112a is at the angular limit (that is, the angle θ3). Second, the angular limit of the first hinge assembly 112a can balance of the entire system. For the support configuration shown in FIG. 4C, a center of gravity C3 of the entire system (i.e. the article 100 and the electronic device 102) is shown. Even though all of the hinge assemblies can be stiff enough to withstand different weights of the components in the system so that segments does not rotate relative to each other without any external force, the entire system could still tip over at a pivot point, such as at the location of the first hinge assembly 112a in the direction R1, should the system become unbalanced. This is due in part to the electronic device 102 being significantly heavier than the first segment 104a. The angular limit of the first hinge assembly 112a can depend on the location of center of gravity C3. The angular limit θ3 can shift the center of gravity C3 inwards, and thus, balance the entire system. In some cases, the angle θ3 may include a value in the range of 30 to 75 degrees. In one embodiment, the angle θ3 is 60 degrees.

The second hinge assembly 112b may also include one or more angular limits. For example, the second hinge assembly 112b may include a first hard stop at 180 degrees. In other words, for a turn direction towards the first segment 104a in a direction R2 (as shown in FIG. 4B), the third segment 104c can, at most, turn planar relative to the second segment 104b. This hard stop can prevent the third segment 104c and the second segment 104b from forming an outwardly protruding angle at the second hinge assembly 112b when the article 100 is in the closed configuration, which can be aesthetically unpleasing. As shown in FIG. 4C, the second hinge assembly 112b may include a second hard stop at an angle θ4. The angle θ4 may include a value within a range of 60 to 120 degrees. In other words, for a turn direction away from the first segment 104a (in the direction R1), the minimum angle between the second segment 104b and the third segment 104c may include the angle θ4. Once the second hinge assembly 112b reaches this angular limit (at the angle θ4), the third segment 104c can no longer further turn away from the first segment 104a (in the direction R1). This second hard stop can ensure that, at the support configuration shown in FIG. 4C, the third segment 104c does not continue to turn in the direction R1, thereby preventing the third segment 104c (and the electronic device 102) from becoming parallel or even downward relative to the first segment 104a. Due in part to the two hard stops of the second hinge assembly 112b, the second hinge assembly 112b may include an angular range of motion within approximately 60 and 180 degrees such that the third segment 104c can only be rotated relative to the third segment 104c only within the angular range of motion.

The first hinge assembly 112a and the second hinge assembly 112b the second segment 104b can cooperate with the second segment 104b to form a cascading rotational support system. A cascading rotational support system can refer to two or more rotational supports (such as hinge assemblies) that are related or connected to each other based on torques, turn orders, and/or other qualities. For example, the first hinge assembly 112a and the second hinge assembly 112b may include asymmetrical torques that can be related to each other so that the first hinge assembly 112a and the second hinge assembly 112b can move in certain specific orders. Asymmetrical torques can refer to hinge assemblies that may include different torque frictions in different rotational directions. In one embodiment, for a first rotational direction that rotates the second segment 104b away from the first segment 104a, the first hinge assembly 112a may include a first torque friction that is lower than a first torque friction of the second hinge assembly 112b in the first rotational direction (i.e., in the direction R1 as denoted in FIGS. 4B and 4C). On the other hand, for a second rotational direction that rotates the second segment 104b towards the first segment 104a, the first hinge assembly 112a may include a second torque friction that is greater than a second torque friction of the second hinge assembly 112b in the second rotational direction (i.e., in the direction R2 as denoted in FIG. 4B). In one instance, the torque friction of first hinge assembly 112a in the direction R1 can be lower than the torque friction of the second hinge assembly 112b in both the direction R1 and the direction R2.

The first hinge assembly 112a and the second hinge assembly 112b can cooperate with the second segment 104b to form a cascading rotational support system. A cascading rotational support system can refer to two or more rotational supports (such as hinge assemblies) that are related or connected to each other based on torques, turn orders, and/or other qualities. For example, the first hinge assembly 112a and the second hinge assembly 112b may include asymmetrical torques that can be related to each other so that the first hinge assembly 112a and the second hinge assembly 112b can move in certain specific orders. Asymmetrical torques can refer to hinge assemblies that may include different torque frictions in different rotational directions. In one embodiment, for a first rotational direction that rotates the second segment 104b away from the first segment 104a, the first hinge assembly 112a may include a first torque friction that is lower than a first torque friction of the second hinge assembly 112b in the first rotational direction (i.e., in the direction R1 as denoted in FIGS. 4B and 4C). On the other hand, for a second rotational direction that rotates the second segment 104b towards the first segment 104a, the first hinge assembly 112a may include a second torque friction that is greater than a second torque friction of the second hinge assembly 112b in the second rotational direction (i.e., in the direction R2 as denoted in FIG. 4B). In one instance, the torque friction of first hinge assembly 112a in the direction R1 can be lower than the torque friction of the second hinge assembly 112b in both the direction R1 and the direction R2.

In addition, a cascading rotational support system can be achieved by adjusting the relative torque frictions between the first hinge assembly 112a and the second hinge assembly 112b. A cascading rotational support system can also be achieved by mechanically and/or electrically connecting the first hinge assembly 112a and the second hinge assembly 112b so that some torque from the first hinge assembly 112a can be transferred to the second hinge assembly 112b, or vice versa. By having specific relationship between the hinge assemblies, the order of rotation of the hinge assemblies can be specified.

The cascading rotational support system and the presence of hard stops can facilitate a natural transition between the closed configuration shown in FIG. 4A and the support configuration shown in FIG. 4C. In order to open or closed the system, users may naturally or conveniently apply a turning force near the top edge 154 (labeled in FIGS. 4B and 4C) of the electronic device 102. From the closed configuration in FIG. 4A to the intermediate configuration in FIG. 4B in the direction R1, the second hinge assembly 112b can remain stationary while the first hinge assembly 112a rotates even a force is applied at top edge 154 because the torque friction of the second hinge assembly 112b is greater than the torque friction of the first hinge assembly 112a in the direction R1. Hence, the third segment 104c can remain planar with the second segment 104b in the intermediate configuration of FIG. 4B until the first hinge assembly 112a reaches the hard stop at the angle θ3. Once the first hinge assembly 112a reaches the hard stop, the first hinge assembly 112a can no longer be turned in the direction R1 and the second hinge assembly 112b can begin to turn in the direction R1 so that the article 100 is transitioned from the intermediate configuration of FIG. 4B to the support configuration of FIG. 4C when a force continues to be applied at the top edge 154.

In the support configuration of FIG. 4C, the first hinge assembly 112a reaches the angular limit. As a result, the first hinge assembly 112a remains stationary without a user manually holding the second segment 104b, and only the second hinge assembly 112b may continue to rotate. From the user's perspective, when the viewing angle of the electronic device 102 is adjusted, the first hinge assembly 112a is "locked." In this regard, for turning the electronic device 102 in the direction R1 (i.e. making the electronic device 102 flatter relative to the first segment 104a), only the second hinge assembly 112b may continue to rotate because the first hinge assembly 112a has already reached its angular limit. Further, for turning the electronic device 102 in the direction R2 (i.e. making electronic device 102 steeper relative to first segment 104a), it is also only the second hinge assembly 112b that rotates in direction R2 because the second hinge assembly 112b has a higher torque friction than the second hinge assembly 112b in the direction R2. Due in part to only the second hinge assembly 112b moving, the viewing angle of the electronic device 102 can be conveniently and finely adjusted by a user, even in instances when the user applies a force to the top edge 154.

This asymmetrical torque friction hinge system with hard stops implemented can also allow a natural transition from the support configuration shown in FIG. 4C back to the closed configuration shown in FIG. 4A. When the third segment 104c is rotated in the direction R2 in the configuration of FIG. 4C, the first hinge assembly 112a can remain stationary. When the third segment 104c continues to rotate in the direction R2 all the way back to the intermediate configuration of FIG. 4B, the second hinge assembly 112b will reach one of the aforementioned hard stops at 180 degrees. Moreover, in the intermediate configuration of FIG. 4B, only the first hinge assembly 112a is rotatable in the direction R2. Hence, a torque in the direction R2 can close the first hinge assembly 112a and turn the article 100 back to the closed configuration shown in FIG. 4A.

The turn order of a cascading rotational support system can be specified in some embodiments even when a force is applied at the top edge 154. For example, in a first rotational direction R1 from the closed configuration (in FIG. 4A) to the support configuration (in FIG. 4C), the first hinge assembly 112a can be turned prior to the second hinge assembly 112b being turned. Conversely, in a second rotational direction R2 from the support configuration (in FIG. 4C) to the closed configuration (in FIG. 4A), the second hinge assembly 112b can be turned prior to the first hinge assembly 112a being turned.

According to one embodiment, the cascading rotational support system can include a first rotation element coupled to the first segment 104a and a second segment rotation element coupled to the third segment 104c such that the cascading rotational support system can suspend, position and orient the electronic device 102 above the first segment 104a at a desirable viewing angle and position. When a first torque is applied to the third segment 104c (i.e. a force applied in a first rotational direction such as the direction R1) to change the article 100 from a closed configuration to a support configuration, only the first rotation element can rotate until the first rotation element reaches a hard stop in the first rotational direction. When a second torque is applied to the third segment 104c (i.e. a second force applied in a opposite rotational direction such as direction R2) to change the article 100 from a support configuration to a closed configuration, only the second rotation element can rotate until the second rotation element reaches a hard stop in the second rotational direction. The first rotation element and the second rotation element may each refer to a hinge assembly described herein. It should be noted that while various hard stops and asymmetrical torque friction hinge systems are described herein with a preferred embodiment, those features are only optional and should not be construed as limiting.

Figure 5:
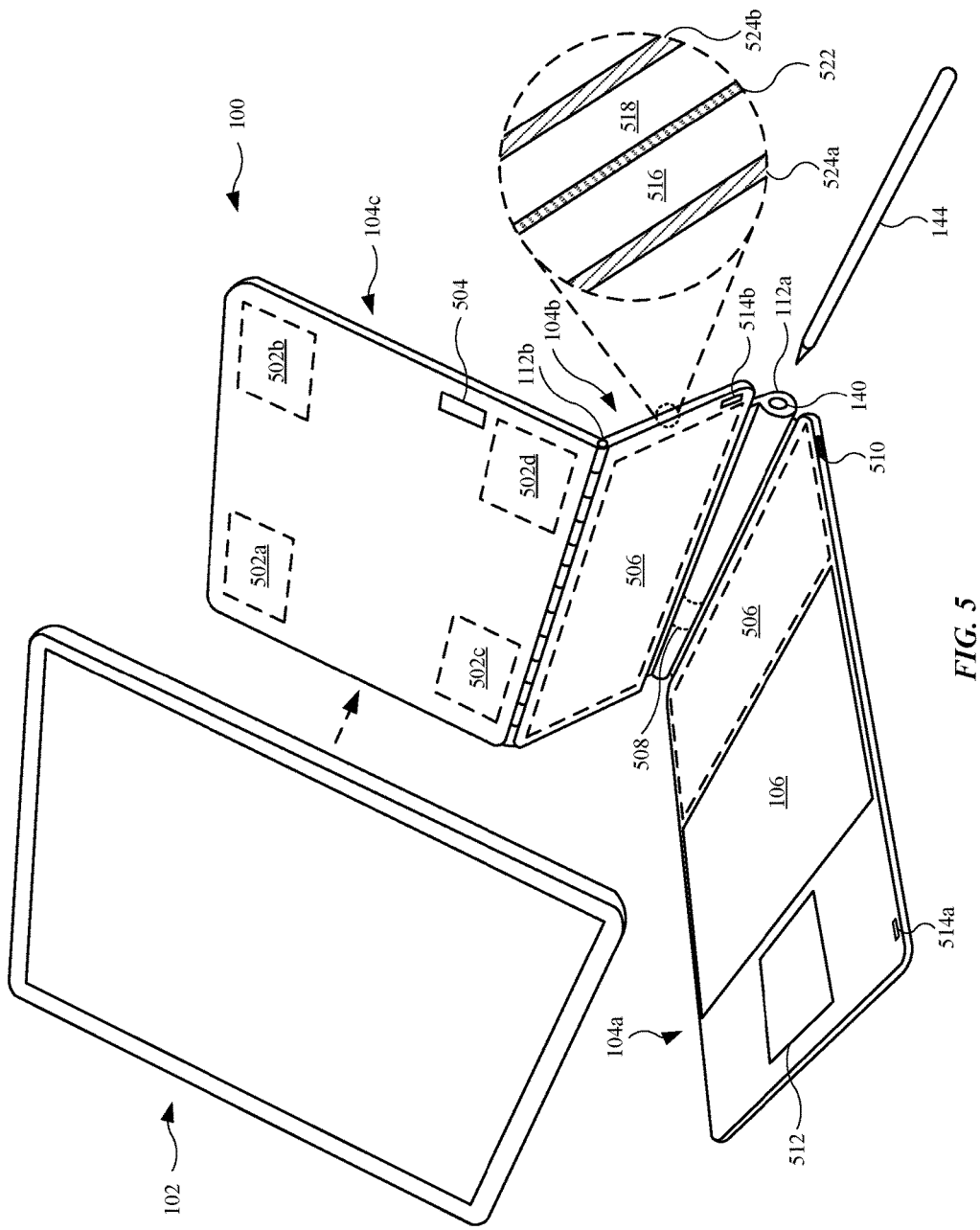
FIG. 5 illustrates an isometric view of the electronic system shown in FIG. 1, showing the electronic device separated from the article along with a digital pen.

The article 100 may include additional features and components that provide added benefits and functionalities to the article 100 as well as to the electronic device 102. For example, FIG. 5 illustrates an isometric view of an electronic system showing the article 100 separated from the electronic device 102. In some embodiments, the article 100 can include one or more attachment components that can be used to removably attach the electronic device 102. For example, the article 100 may include a first attachment components 502a, a second attachment component 502b, a third attachment component 502c, and a fourth attachment component 502d. These attachment components can retain the electronic device 102 through frictional fit, magnetic coupling, mechanical fastening, and/or any other suitable combination. In this regard, in some embodiments, each of the first attachment components 502a, the second attachment component 502b, the third attachment component 502c, and the fourth attachment component 502d are magnetic elements. As shown, the aforementioned attachment components are carried by the third segment 104c. Further, the aforementioned attachment components can be embedded in the third segment 104c so as to not be visible. When the aforementioned attachment components are magnetic elements, the magnetic elements can be permanent magnets such as ceramic rare earth magnets (e.g., samarium-cobalt, neodymium, other rare earth magnets) or ferrous-based magnets. The aforementioned attachment components can also include a Halbach array of magnets. In other cases, some or all of the magnetic elements can be formed of magnetically attractive material, such as a ferromagnetic material (e.g., a ferrite, a ferrous metal or alloy of iron, nickel, or cobalt). The magnetic elements of the third segment 104c can form one or more magnetic circuits with the magnetic elements (not shown in FIG. 5) located in the electronic device 102, and as a result, the magnetic elements provide an attractive force to retain the electronic device 102. In additional to retaining the electronic device 102, the magnetic elements can be in a specific number and/or arranged in a specific pattern to align the magnetic elements of the electronic device 102 so that the electronic device 102 can be aligned with the third segment 104c in a specific manner (e.g., align along the edges).

In another embodiment, each of the first attachment components 502a, the second attachment component 502b, the third attachment component 502c, and the fourth attachment component 502d can take the form of mechanical fastener. For example, pairs of lock and loop fasteners such as Velcro can be use. For example, the aforementioned attachment components can provide loops, while the housing of the electronic device 102 provides locks. In yet another embodiment, each of the first attachment components 502a, the second attachment component 502b, the third attachment component 502c, and the fourth attachment component 502d can utilize frictional fit to retain the electronic device 102. For example, although not shown in FIG. 5, the third segment 104c may not be flat. Rather, each of the aforementioned attachment components can form sidewalls along the third segment 104c that cooperate with the third segment 104c to define a recessed region that may include a size and shape in accordance with the electronic device 102 (or portion thereof) in order to receive and retain the electronic device 102 through friction fit. While several possible configurations of the aforementioned attachment components are described herein, those skilled in the art would understand that those are merely non-limiting examples.

In some embodiments, the article 100 includes an interface 504 that allows the exchange of information and power between the article 100 and the electronic device 102. The article 100 can include an internal electrically conductive material, such as flexible circuitry or an electrically conductive fabric, used to electrically couple the input device 106 and the electronic device 102. While the interface 504 is located on the third segment 104c, those skilled in the art would understand that the location is only exemplary and is not limiting. The interface 504 can allow the input device 106 to provide and/or exchange commands with the electronic device 102. As it will be discussed in further detail, the interface 504 may also allow the transfer of power to and/or from the article 100. It should be noted that the interface 504 can also be referred as a charge terminal, an information terminal, an electrical contact, a transceiver, an antenna, a port, an inlet, a charge station, an inductive charge receiver or transmitter, a near-field communication ("NFC") charge receiver or transmitter, a communication component or other suitable term as dictated by its particular features and functions.

In some embodiments, the interface 504 is an electrical contact such as a smart connector. The electronic device 102 may include a corresponding electrical contact (not shown in FIG. 5) on the back of the electronic device 102. Hence, when the electronic device 102 is attached to the third segment 104c, the interface 504 can complete a circuit with the electrical contact of the electronic device 102 so that a direct connection is established between the article 100 and the electronic device 102. In another embodiment (not shown in FIG. 5), the interface 504 includes a connection port such as a USB and/or USB-C connection port that allows the article 100 to be electrically connected to the electronic device 102 via an electrical cable. In yet another embodiment, the interface 504 includes a short distance inductive communication component such as an NFC transceiver that communicates with the electronic device 102 through short-ranged protocols and exchanges power through inductive charging. In yet another embodiment, the interface 504 includes a wireless RF antenna that communicates using wireless protocols such as Bluetooth and/or Wi-Fi. While several possible types of the interface 504 are described herein, those skilled in the art would understand that those are merely non-limiting examples.

In some embodiments, the article 100 can include one or more power storage units 506. The one or more power storage units 506 may include batteries and/or supercapacitors. As shown, the one or more power storage units 506 are carried by, and embedded in, the first segment 104a and the second segment 104b. However, those skilled in the art would understand that the particular segments shown in FIG. 5 as carrying the one or more power storage units 506 are only exemplary and are not limiting. The one or more power storage units 506 can be used to store energy supplied by the electronic device 102 and/or another charge source (e.g., a wall plug). The one or more power storage units 506 are capable of transferring electrical energy to the electronic components on the article 100, which may include the input device 106. Further, the one or more power storage units 506 are capable of transferring electrical energy to the electronic device 102 and/or to other devices, such as the digital pen 144.

The article 100 may include a charge terminal 508 located in the first hinge assembly 112a. The charge terminal 508 that can transfer energy from the one or more power storage units 506 to the digital pen 144 when then digital pen 144 is inserted into the opening 140 defined by the hollow body of the first hinge assembly 112a. The one or more power storage units 506 can be connected to the input device 106, the interface 504, and the charge terminal 508 through internal circuitry (not shown in FIG. 5), such as printed circuit boards, cables, and/or flexible circuits.

In some cases, the article 100 can include a power inlet 510. The one or more power storage units 506 can be charged by an external power source (e.g. a wall plug or a USB power source) via the power inlet 510. The power inlet 510 can be a standard charging port such as a USB or USB-C connection port, a plug-in for a direct DC connection (or an AC source with a transformer), a customized charging inlet, and/or any other suitable power inlet. The power inlet 510 can be located at the first segment 104a or can be located at any other suitable location(s) of the article 100. The power inlet 510 can be used to charge the one or more power storage units 506, which in turn can transfer the energy to the electronic device 102, so that the article 100 can act as supplemental power source for the electronic device 102. In some cases, the power inlet 510 may also be used to directly charge the electronic device 102 and/or the digital pen 144. In some cases, the article 100 can include additional ports that allow information exchange between the article 100 and another electronic device (not shown in FIG. 5), such as a mouse that can be used to control portable the electronic device 102. For example, an additional port can include a USB-C connection port.

In some embodiments, the electronic device 102 can supply energy to the electronic components of the article 100 (e.g. the input device 106) through the interface 504. In this regard, in some embodiments (not shown in FIG. 5), the one or more power storage units 506 are not integrated into the article 100. The digital pen 144, when retained by the first hinge assembly 112a, can also be charged by the energy supplied by the electronic device 102.

In some embodiments, the article 100 may not include the input device 106. In other embodiments, the input device 106 can be of different types. In one particular embodiment, the input device 106 is a keyboard. In these embodiments, the input device 106 may include different designs that can include different materials, coating, and components such as a rubber dome, a metal dome, and/or any suitable combination. The input device 106 can include backlights whose power can be supplied either by the one or more power storage units 506 or directly from the electronic device 102. Further, when the input device 106 is a keyboard, the input device 106 includes a membrane or fabric layer that acts as a cosmetic or functional seal layer. The seal of the input device 106 may include hard rigid keycaps above the fabric layer. Some or all keys of the keyboard can also contain a touch sensor to facilitate multi-touch sensing of a key. Also, in some embodiments, the first segment 104a includes a touch sensor 512 that can serve as a track pad.

In another embodiment (not shown in FIG. 5), alternative to or in addition to a keyboard, the input device 106 includes a touch sensor, such as a capacitive touch sensor. For example, the input device 106 can occupy a substantial area, including a large majority of the interior surface 108a of the first segment 104a. The touch sensor can support multi-touch sensing. Users can control the electronic device 102 via the touch sensor of the input device 106 through different finger movements and gestures. In yet another embodiment (not shown in FIG. 5), the input device 106 includes a display assembly with touch sensing ability. Hence, the input device 106 can provide different images to the user, by way of the display. In one case, the electronic device 102 can control the display of image data of the input device 106. In another case, the article 100 can include a processor that controls or that works with the electronic device 102 to control the display of image data. In one instance, the input device 106 can display a virtual keyboard. In yet another embodiment, the input device 106 can be removably coupled to the first segment 104a. In some cases, the entire or part of the first segment 104a can be removably coupled to the article 100. Hence, a first type of the input device 106 can be replaced with a second input device or a second type of input device. For example, a keyboard can be removably coupled to the article 100 and can be replaced by a track pad. In some cases, one type of the input device 106 can include another portable electronic device having a touch screen display assembly. Hence, a second portable electronic device can replace the first segment 104a (or part thereof) and can electrically couple with the electronic device 102 through the circuitry of the article 100 and the interface 504.

In some embodiments, the electronic device 102 can detect the configuration of the article 100 and automatically switch to different operating modes based on the configuration of the article 100. For example, the article 100 can include a first triggering element 514a along an edge of the first segment 104a such that the first triggering element 514a aligns with an edge of the electronic device 102. The article 100 may further include a second triggering element 514b along an edge of the second segment 104b such that the second triggering element 514b aligns with an edge of the electronic device 102. The first triggering element 514a and the second triggering element 514b can work in conjunction with a first sensor and a second sensor (not shown in FIG. 5), respectively, of the electronic device 102. The first sensor and the second sensor can be connected to a processor. The sensors can include magnetic sensors (e.g. Hall effect sensors, magnetometers, etc.), optical sensors, wireless sensors and other types of suitable sensors. The first triggering element 514a and the second triggering element 514b may include any corresponding suitable elements. For example, when the sensors are magnetic, the first triggering element 514a and the second triggering element 514b can be magnetic elements such as permanent magnets or ferromagnetic metals. When the sensors are optical sensors, the first triggering element 514a and the second triggering element 514b can be a light source such as a LED light source.

This arrangement of sensors can be used to detect when the article 100 is in a closed configuration (shown in FIG. 4A) or in other configurations such as the support configuration (shown in FIG. 4C). In the closed configuration, both the first triggering element 514a and the second triggering element 514b can be brought in a close proximity to the electronic device 102. In a support configuration, both the first triggering element 514a and the second triggering element 514b can be brought away from the electronic device 102. Based on the detection the first triggering element 514a and/or the second triggering element 514b by the sensors, the processor of the electronic device 102 can deduce the configuration of the article 100. The electronic device 102 can automatically enter different operating modes based on the configuration of the article 100. For example, when the article 100 is in the closed configuration, the electronic device 102 can transition to an inactive mode such as a sleep mode.

In addition to various electronic features, the article 100 can also have additional mechanical features that enhance the capabilities of the article 100. For example, since the second segment 104b can be an intermediate segment that connects to the first segment 104a and the third segment 104c, the second segment 104b can be primarily responsible for the dampening the system. The second segment 104b can include structural elements that are stiff, but less stiff compared to other segments and/or hinge assemblies of the article 100. Due in part the location of the second segment 104b, the second segment 104b can act effectively as a spring that provides dampening to the article 100 against vibrations caused by situations such as when a user is carrying the system in a moving automobile. In some instances, the second segment 104b can deflect more than half of the amplitude of a given vibration.

The second segment 104b can include additional internal structural to provide dampening to the article 100. For example, the enlarged partial cross-sectional view shows internal layers of the second segment 104b, which can utilize constrained layer damping principles to provide damping to the electronic device 102. The second segment 104b can include a substrate layer 516, which can define a main structural layer of the second segment 104b. The second segment 104b can further include a secondary structural layer 518. The second segment 104b can further include a viscoelastic material 522 that defines a layer sandwiched between the substrate layer 516 and the secondary structural layer 518. The second segment 104b can further include a first layer 524a and a second layer 524b. The first layer 524a can combine with the second layer 524b to wrap around and can cover the substrate layer 516, the secondary structural layer 518, and the viscoelastic material 522. The substrate layer 516 and the secondary structural layer 518 can be made from the same or different materials and may include the same or different thicknesses. Also, the substrate layer 516 and the secondary structural layer 518 can be significantly stiffer than the viscoelastic material 522. When the system vibrates, the vibration can create shear at the viscoelastic material 522. The viscoelastic material 522 can then covert the kinetic energy associated with the vibration into heat, thus providing dampening to the system. It should be noted that this internal structure does not have to be present on the second segment 104b. Also, the internal structure can also be present on other segments of the article 100.

Referring to the second hinge assembly 112b, the second hinge assembly 112b can include a number of short segments connected in series. Hence, each segment may include a reduced overall contribution to the torque of the second hinge assembly 112b. Because of the short segments, each segment can become effectively significantly stiffer. As a result, the second hinge assembly 112b can also become stiffer to withstand the weight of the electronic device 102. The first hinge assembly 112a can also include similar types of hinge to increase the stiffness.

Figure 6A:
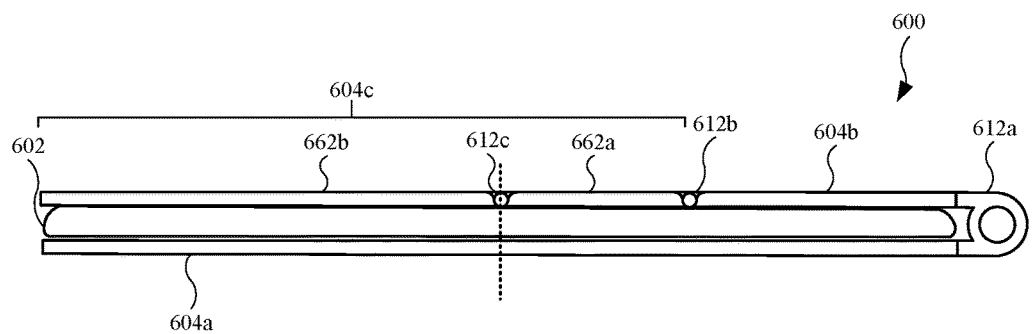
FIGS. 6A and 6B illustrate two side views of an electronic system in different configurations, in accordance with some embodiments.
Figure 6B:
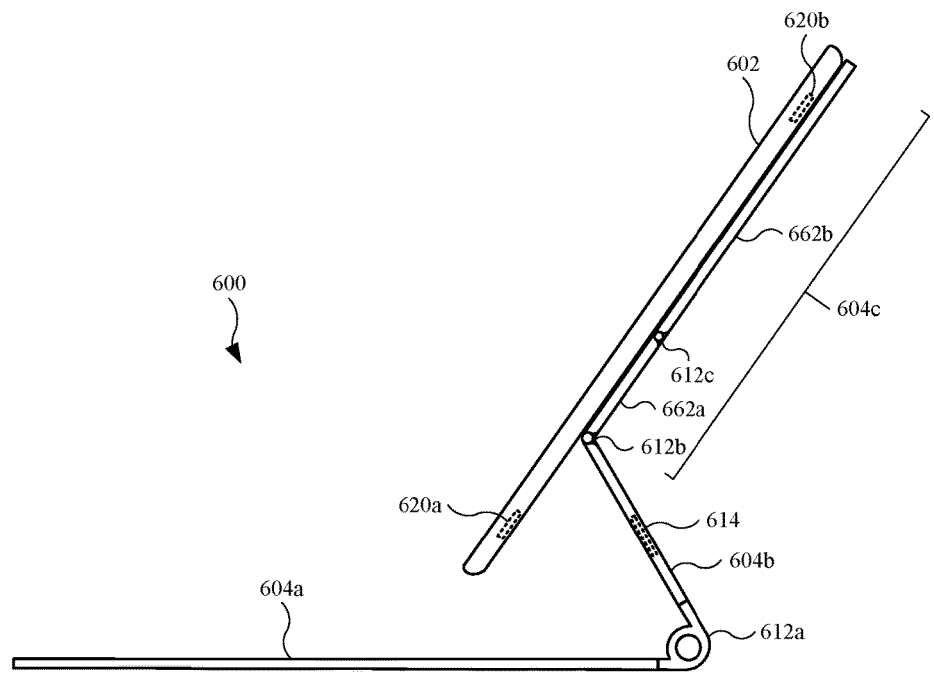

FIGS. 6A and 6B illustrate two side views of an electronic system in different configurations, in accordance with some embodiments. FIG. 6A illustrates in a closed configuration and FIG. 6B illustrates in a support configuration. As shown, the electronic system includes an article 600. Similar to the article 100 shown in FIGS. 1-5, the article 600 may include a multi-segment folio and can have any other features that are described in and associated with FIGS. 1-5. For example, the article 600 can include a first segment 604a, a second segment 604b, and a third segment 604c. The article 600 may include a first hinge assembly 612a (acting as a first rotational element) connected to the first segment 604a and the second segment 604b. The article 600 may further include a second hinge assembly 612b (acting as a second rotational element) connected to the second segment 604b and the third segment 604c. The article 600 may carry an electronic device 602 in any manner previously described.

The third segment 604c can be further divided into two sub-segments. In this regard, the third segment 604c may include a first sub-segment 662a and a second sub-segment 662b. The first sub-segment 662a can be coupled to the second sub-segment 662b via a third hinge assembly 612c (acting as a first rotational element) so that the first sub-segment 662a is rotatable relative to the second sub-segment 662b. In one case, the third hinge assembly 612c can be located at or near the midline (shown as a dotted line in FIG. 6A) of electronic device 602. In terms of the sizes of the segments, in one case, the first segment 604a can have a size and shape generally in accordance with electronic device 602. The second sub-segment 662b can have half of the size of the first segment 604a. The combination of the first sub-segment 662a and second segment 604b can also have half of the size of first segment 604a. Accordingly, the size of the combination of the first sub-segment 662a and second segment 604b can equal the size of the second sub-segment 662b. As shown in FIG. 6B, in a support configuration, the article 600 can be arranged similar to the support configuration of article 100 shown in FIGS. 1-5. The second segment 604b can be at an acute angle relative to the first segment 604a, similar to a manner previously described. Also, the first sub-segment 662a can be coupled to the second sub-segment 662b can remain planar to each other and third segment 604c can be at an obtuse angle relative to first segment 604a, similar to a manner previously described.

Referring to FIG. 6B, the article 600 can include a triggering element 614 carried by the second segment 604b. The electronic device 602 can include a first sensor 620a at a top side of the electronic device 602 and a second sensor 620b at a bottom side of the electronic device 602. It should be noted that the numbers, locations, and arrangements of triggering elements and sensors are exemplary only. Depending on the configuration of the article 600, the second segment 604b can be positioned in different locations relative to electronic device 602. Hence, the triggering element 614 may be sufficiently close to one of the first sensor 620a or the second sensor 620b so that the triggering element 614 may trigger either first sensor 620a or second sensor 620b. This will be shown below. Alternatively, in some configurations, the triggering element 614 may not trigger any sensor at all. For example, in a support configuration shown in FIG. 6B, the second segment 604b can be brought away from the electronic device 602, and the triggering element 614 does not trigger any of the first sensor 620a or the second sensor 620b.

In addition to the support configuration, the article 600 can be rearranged to another configuration that can be referred to as a clipboard configuration. For example, FIGS. 7A-7D illustrates a transition from a closed configuration shown in FIG. 7A to the clipboard configuration shown in FIG. 7D. First, the article 600 can transition to a first intermediate configuration shown in FIG. 7B by turning the first hinge assembly 612a in a manner that causes the second segment 604b and the third segment 604c to move in a direction away from the first segment 604a. Second, the article 600 can transition to a second intermediate configuration shown in FIG. 7C by turning the third hinge assembly 612c in a manner that causes the third segment 604c to move further in a direction away from the first segment 604a. By turning the third hinge assembly 612c, the second sub-segment 662b can rotate relative to the first sub-segment 662a. Third, the third hinge assembly 612c can continue to turn so that the second sub-segment 662b can be folded onto both the first sub-segment 662a and the second segment 604b. Further, the first hinge assembly 612a can be turned in a direction back to the first segment 604a, as shown in the clipboard configuration in FIG. 7D. The electronic device 602 can largely overlay the first segment 604a such that the edges of the electronic device 602 can align with the edges of the first segment 604a. The rest of the segments can be stacked together and positioned between the electronic device 602 and the first segment 604a at one end of the electronic device 602. The stacked segments can an inclination of the electronic device 602 relative to the first segment 604a. Hence, this configuration can allow the article 600 to serve like a clipboard for the electronic device 602. In the entire transition from the closed configuration to the clipboard configuration, the electronic device 602 can remain attached to the article 600.

Figure 7A:
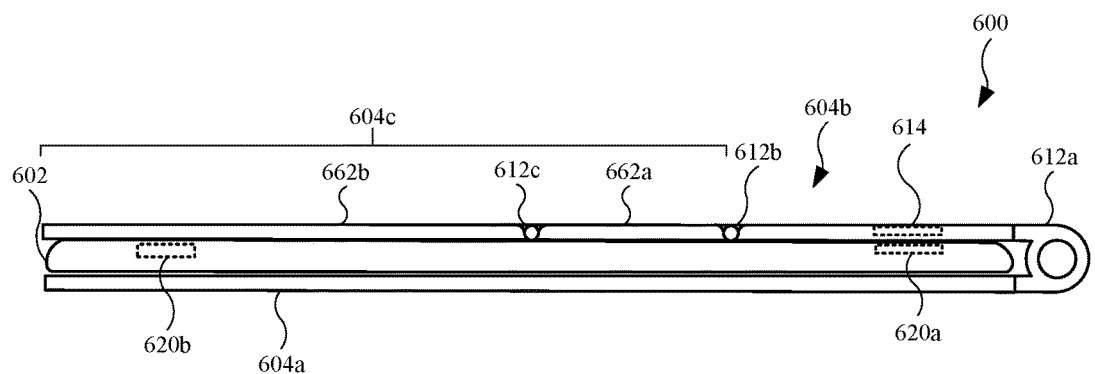
FIG. 7A-7D illustrate a transition of the electronic system, shown in FIGS. 6A and 6B, transitioning from a closed configuration to a clipboard configuration.
Figure 7B:
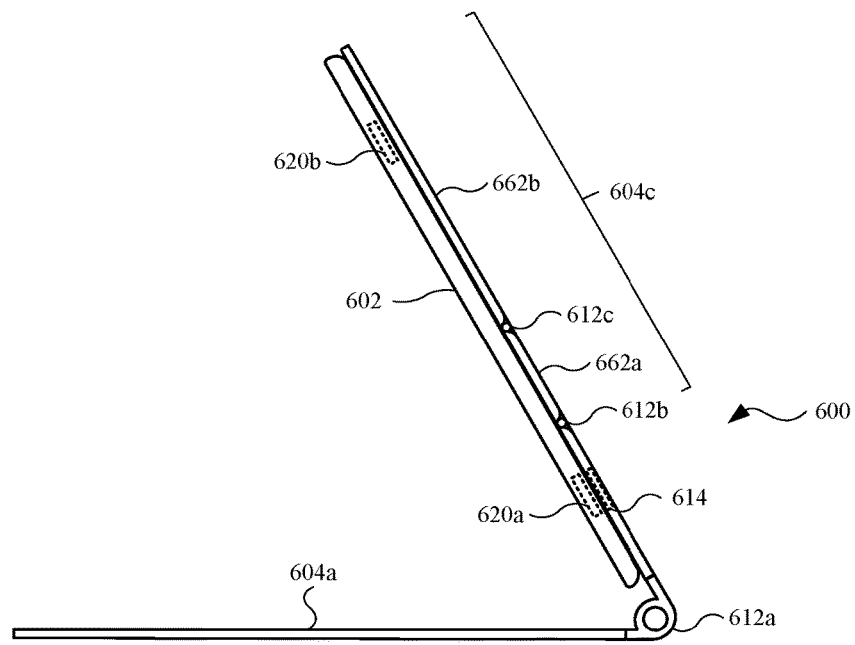
Figure 7C:
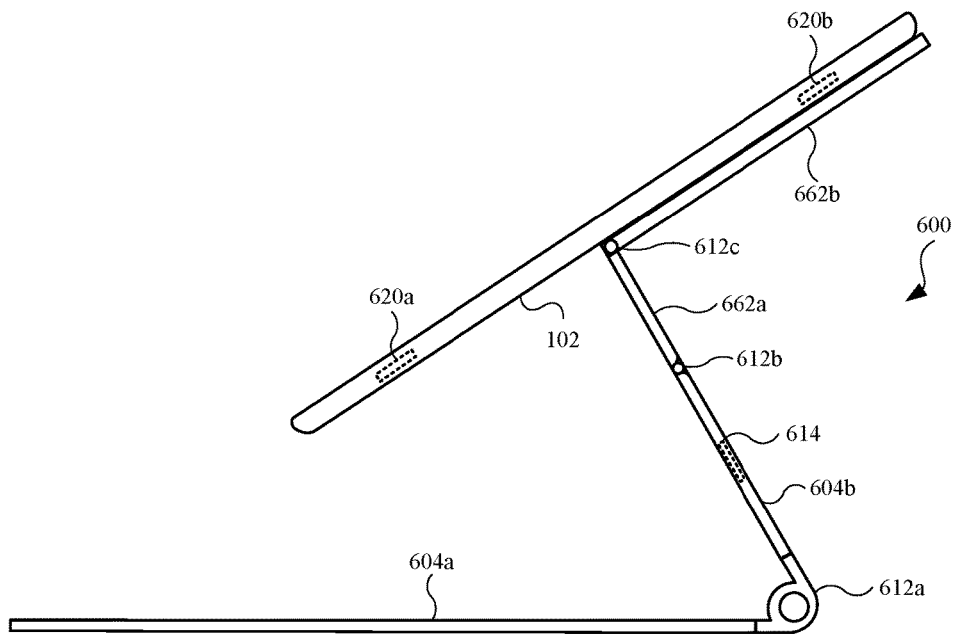
Figure 7D:
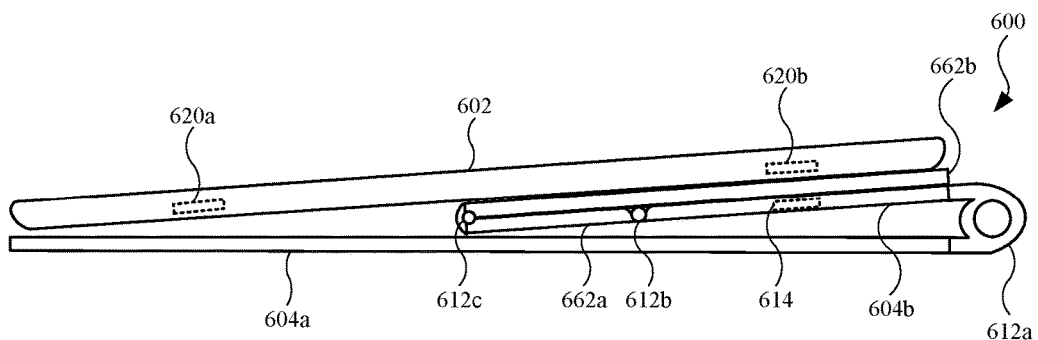

In a closed configuration shown in FIG. 7A, the triggering element 614 can be in a close proximity of first sensor 620a to trigger the first sensor 620a. For example, if the triggering element 614 is magnetic, the external magnetic field generated by the triggering element 614 has a field strength that, in the closed configuration, exceeds a threshold level of first sensor 620a, thereby triggering the first sensor 620a. In a clipboard configuration shown in FIG. 7D, the triggering element 614 can be in a close proximity to the second sensor 620b, and accordingly, can trigger the second sensor 620b. It should be noted that because the second sub-segment 662b can be located between the triggering element 614 and the second sensor 620b, the threshold level of the second sensor 620b can be set at a lower level than the threshold level of the first sensor 620a. Based on the signals of the first sensor 620a and the second sensor 620b, a processor (not shown) of the electronic device 602 can determine the configuration of the article 600 and may enter different operation states based on the configuration.

Figure 8:
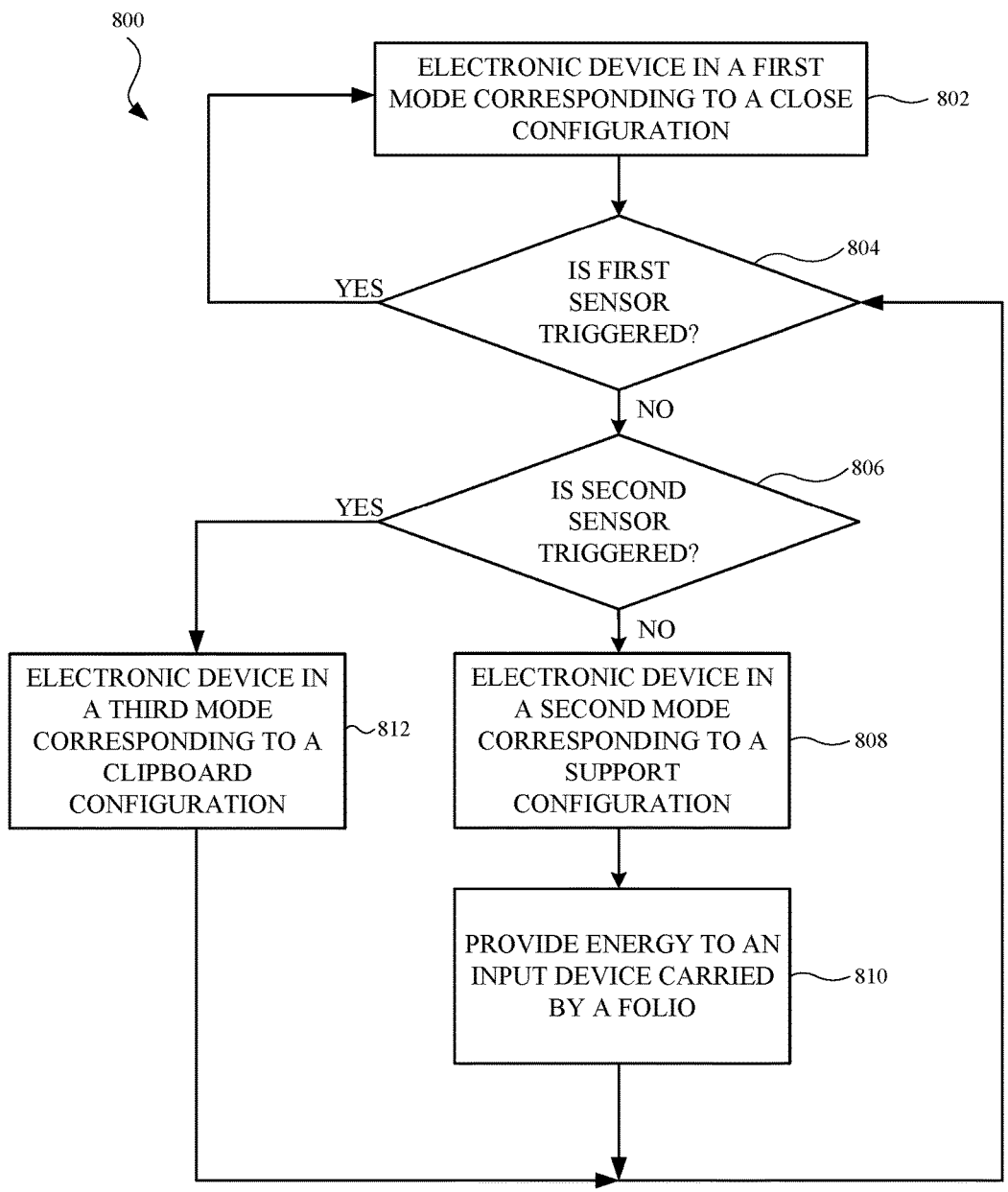
FIG. 8 illustrates a block diagram of a method for automatically altering an operation state of a portable electronic device based on the configuration of an article removably coupled to the portable electronic device, in accordance with some embodiments.

FIG. 8 shows a block diagram of a method 800 for automatically altering an operation state of a portable electronic device based on the configuration of an article removably coupled to the portable electronic device, in accordance with some embodiments. The portable electronic device may refer to an electronic device described herein and the article can refer to the article 100 (in FIGS. 1-5) or the article 600 (in FIGS. 6A-7D). Also, the article may include a folio or cover for an electronic device described herein. The portable electronic device can include a first sensor and a second sensor, such as the first sensor 620a and the second sensor 620b in FIGS. 6 and 7A-D. The folio can include one or more triggering elements such as the triggering element 614 in FIGS. 7A-D. In one case, a second segment can carry the triggering element.

The method 800 can begin at step 802 when the electronic device is in a first mode that corresponds to a closed configuration of the folio. For example, an exemplary first mode can be an inactive mode such as a sleep mode. The method 800 can also include step 804, which may include a decision stage that determines whether the first sensor is triggered. If the first sensor is triggered, the triggering element can be in proximity with the first sensor. This can be associated with a closed configuration where a second segment of the article covers at least part of a surface of the electronic device. Hence, the electronic device can remain in the first mode. If the first sensor is not triggered, the first sensor can send a signal to a processor of the electronic device. The receipt of such signal can indicate that the triggering element carried is no longer in proximity to the first sensor. At this stage, the method 800 can then proceed to step 806. Step 806 may include another decision stage that determines whether the second sensor is triggered. If the second sensor is not triggered, then neither the first nor the second sensor is triggered, and the method 800 can then proceed to step 808. This can be associated with a support configuration where the second segment is brought away from the electronic device (e.g. the configuration shown in FIG. 3 or FIG. 6B). At step 808, the processor can cause the electronic device to switch from the first mode to a second mode, which may correspond to the support configuration. Also, the second mode may include an active mode. In some cases, the support configuration can be associated with an active input device (e.g. FIG. 3). Hence, at step 810, the electronic device can provide energy to an input device carried by the article, such as a keyboard or a track pad, so that the input device is operational. In some cases, the input device may indicate to the user that power is received from the electronic device (such as by turning on an LED or turning on backlights of the keyboard). Referring back to step 806, if the second sensor is triggered, the method 800 proceeds to step 812, and processor can cause the electronic device to switch to a third mode, which corresponds to the clipboard configuration. The third mode may refer the article being in a clipboard configuration (e.g. the configuration shown in FIG. 7D). In some cases, the third mode can be the same as the second mode, which can also define an active mode. In other cases, the electronic device in the third mode can automatically launch an application such as a note-taking application or a drawing application because the clipboard configuration can be associated with a "scratch pad" configuration for users to use a digital pen. The exact application launched can be based on a user setting that is user selectable. After step 810 or 812, the method can return to step 804 so that the processor of the electronic device can continue to monitor the status of the sensors in order to determine the configuration of the article.

Figure 9:
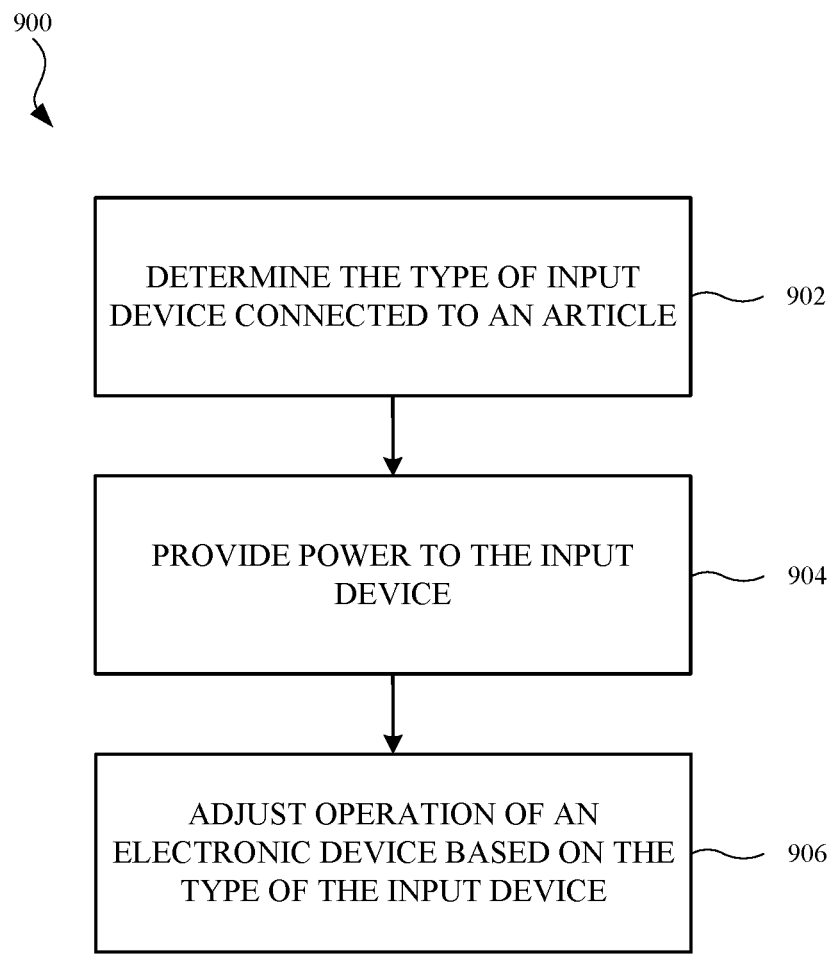
FIG. 9 shows a block diagram depicting a method for automatically altering operation of a portable electronic device based on different types of input devices in communication with the portable electronic device, in accordance with some embodiments.

FIG. 9 shows a block diagram 900 depicting a method for automatically altering operation of a portable electronic device based on different types of input devices in communication with the portable electronic device, in accordance with some embodiments. The input device can be removably coupled to an article so that an input device of the article is in communication with the portable electronic device through the circuitry of the article. The method can begin at step 902. At step 902, the electronic device can determine the type of the input device connected to the article through signal communication. At step 904, the electronic device can optionally provide power to the input device based on the type of the input device determined. For example, in one case the input device may include a keyboard without backlights while in another case the input device may include a keyboard with backlights. In yet another case the input device has its own battery so that the electronic device can determine that no power is needed to provide to the input device. At step 906, the electronic device can adjust its operation based on the type of the input device. For example, the electronic device can be configured to show a virtual keyboard on a display when a user selects an input field in a software application. However, when the input device is detected as a keyboard, the electronic device can alter its operation so the virtual keyboard is no longer shown. In another case, when the input device is detected to have a second display assembly, the electronic device can transmit image data to the input device.

Figure 10:
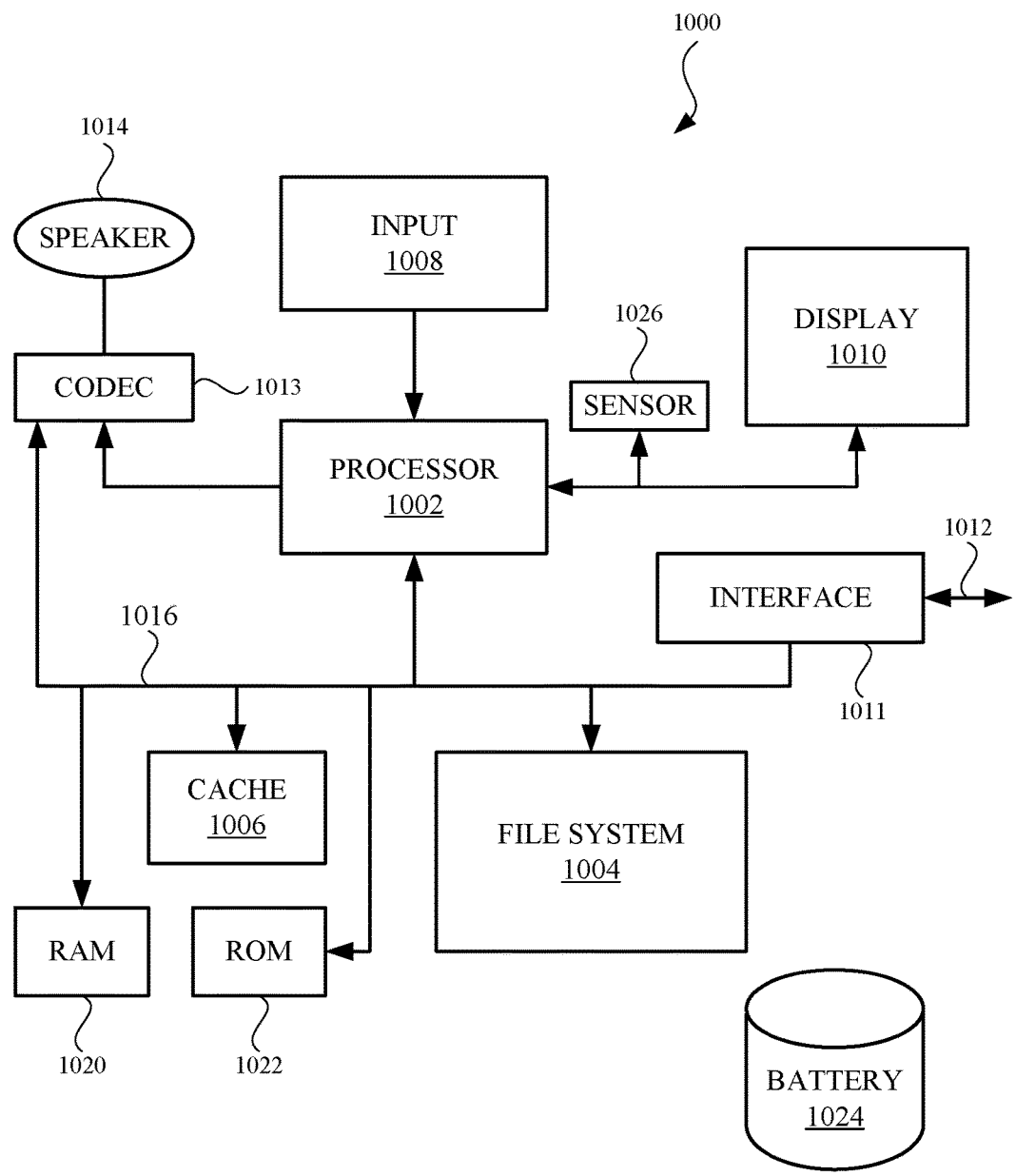
FIG. 10 illustrates a block diagram of a computing device in accordance with some embodiments.

FIG. 10 is a block diagram that illustrates circuitry of a computing device 1000 in accordance with some embodiments. The computing device 1000 may include an electronic device or an article described herein that includes a processor. An exemplary computing device can contain all or some of the components shown in FIG. 10. The computing device 1000 can include a processor 1002 that pertains to a microprocessor or controller for controlling the overall operation of the computing device 1000. The computing device 1000 can store media data pertaining to media items in a file system 1004 and a cache 1006. The file system 1004 can be, typically, a storage disk or multiple storage disks. The file system 1004 typically can provide high capacity storage capability for the computing device 1000. However, since the access time to the file system 1004 can be relatively slow, the computing device 1000 can also include a cache 1006. The cache 1006 may include, for example, Random-Access Memory (RAM) provided by semiconductor memory. The relative access time to the cache 1006 can be substantially shorter than that for the file system 1004. However, the cache 1006 does not have the large storage capacity of the file system 1004. Further, the file system 1004, when active, can consume more power than does the cache 1006. The computing device 1000 can also include a RAM 1020 and a Read-Only Memory (ROM) 1022. The ROM 1022 can store programs, utilities or processes to be executed in a non-volatile manner. The RAM 1020 provides volatile data storage, such as for the cache 1006. The computing device 1000 may include a battery 1024 that provides electrical energy to components of the computing device 1000.

The computing device 1000 can also include a user input device 1008 that allows a user of the computing device 1000 to interact with the computing device 1000. For example, the user input device 1008 can take a variety of forms, such as a button, keypad, touch screen, audio input interface, visual/image capture input interface, input in the form of sensor data, etc. Still further, the computing device 1000 can include a display 1010 (screen display) that can be controlled by the processor 1002 to display information to the user.

In one embodiment, the computing device 1000 can serve to store multiple media items (e.g., songs, podcasts, etc.) in the file system 1004. When a user desires to have the electronic device play a particular media item, a list of available media items can be displayed on the display 1010. Then, using the user input device 1008, a user can select one of the available media items. The processor 1002, upon receiving a selection of a particular media item, can supply the media data (e.g., audio file) for the particular media item to a coder/decoder (CODEC) 1013. The CODEC 1013 can then produce analog output signals for a speaker 1014. The speaker 1014 can be a speaker internal to the computing device 1000 or external to the computing device 1000. For example, headphones or earphones that can connect to the computing device 1000 would be considered an external speaker.

The computing device 1000 can also include a network/bus interface 1011 that couples to a data link 1012. The data link 1012 can allow the computing device 1000 to couple to a host computer or to accessory articles. The data link 1012 can be provided over a wired connection or a wireless connection. In the case of a wireless connection, the network/bus interface 1011 can include a wireless transceiver. The media items (media assets) can pertain to one or more different types of media content. In one embodiment, the media items can be audio tracks (e.g., songs, audio books, and podcasts). In another embodiment, the media items can be images (e.g., photos). However, in other embodiments, the media items can be any combination of audio, graphical or visual content. The computing device 1000 may include a sensor 1026 that can take the form of circuitry for detecting any number of stimuli. For example, the sensor 1026 can include a Hall Effect sensor responsive to external magnetic field, an audio sensor, a light sensor such as a photometer, and so on. A data bus 1016 can facilitate data transfer between at least the file system 1004, the cache 1006, the processor 1002, and the CODEC 1013.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data that can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A folio for use with a portable electronic device having a display assembly overlaid by a transparent protective layer, the folio comprising:
   a base segment having a size and shape in accordance with the portable electronic device, the base segment comprising an input device capable of communication with the portable electronic device; and
   an attachment segment coupled to the base segment, the attachment segment comprising a mechanism capable of securing to a rear surface of the portable electronic device,
   wherein when the portable electronic device is secured to the attachment segment:
      a closed configuration comprises the base segment overlaying the transparent protective layer, and the attachment segment overlaying the rear surface of the portable electronic device; and
      a support configuration comprises both the portable electronic device and the attachment segment above the base segment, and the attachment segment balances and supports the portable electronic device.

2. The folio of claim 1, further comprising:
   an intermediate segment;
   a first hinge assembly coupled with the base segment and the intermediate segment; and
   a second hinge assembly coupled with the attachment segment and the intermediate segment, wherein the second hinge assembly is capable of supporting both the attachment segment and the portable electronic device at any angle relative to the intermediate segment.

3. The folio of claim 2, wherein the support configuration comprises the first hinge assembly supporting the attachment segment at an acute angle with respect to the base segment.

4. The folio of claim 3, wherein the first hinge assembly comprises a hollow body capable of capturing and retaining a stylus or a pen.

5. The folio of claim 2, wherein (i) the intermediate segment and the attachment segment combined have a size in accordance with the portable electronic device, (ii) the mechanism of the attachment segment is capable of securing the rear surface of the portable electronic device to an interior surface of the attachment segment, and (iii) when the portable electronic device is secured to the interior surface of the attachment segment, a portion of the rear surface of the portable electronic device extends beyond the interior surface of the attachment segment.

6. The folio of claim 1, wherein the attachment segment further comprises an interface used to establish a direct connection with the portable electronic device.

7. The folio of claim 1, wherein the attachment segment further comprises an RF antenna capable of facilitating wireless communication with the portable electronic device.

8. A folio for use with a portable electronic device, the folio comprising:
   a base carrying an input device capable of communicating with the portable electronic device;
   an attachment panel capable of removably coupling with the portable electronic device; and
   a cascading rotational support system having a first rotation element coupled to the base and a second rotation element coupled to the attachment panel such that the cascading rotational support system is capable of suspending the portable electronic device above the base,
   wherein when a first torque is applied to the attachment panel, only the first rotation element rotates until the first rotation element reaches a first hard stop, and
   wherein when a second torque opposite the first torque is applied to the attachment panel, only the second rotation element rotates until the second rotation element reaches a second hard stop different from the first hard stop.

9. The folio of claim 8, wherein in a closed configuration, the base is capable of covering an entire front surface of the portable electronic device and the attachment panel is capable of covering at least a portion of a rear surface of the portable electronic device.

10. The folio of claim 8, wherein the first rotation element has an angular range of motion less than 90 degrees.

11. The folio of claim 8, wherein the second rotation element an angular range of motion within 60 degrees and about 180 degrees.

12. The folio of claim 8, wherein a first torque friction of the first rotation element is less than a first torque friction of the second rotation element in a first rotational direction provided by the first torque, and wherein a second torque friction of the first rotation element is greater than a second torque friction of the second rotation element in a second rotational direction provided by the second torque.

13. A folio for a portable electronic device that includes a display assembly, the folio comprising:
   a first segment carrying an input device that is capable of communication with the portable electronic device;

a second segment pivotally coupled to the first segment; and a third segment pivotally coupled to the second segment, the third segment capable of being removably coupled to the portable electronic device, wherein, in a support configuration, the second segment supports the portable electronic device such that both the portable electronic device and the third segment are suspended above and lack contact with the first segment, and wherein, in a closed configuration, the first segment covers an entirety of the display assembly of the portable electronic device.

14. The folio of claim 13, wherein the second segment comprises a layer of viscoelastic material sandwiched between two structural layers.

15. The folio of claim 13, wherein the folio further comprises a power storage unit that is capable of transferring electrical energy to the portable electronic device.

16. The folio of claim 15, wherein the first segment further carries a power inlet electrically coupled to the power storage unit.

17. The folio of claim 13, wherein the input device is removably coupled to the first segment such that the input device is replaceable with a second input device.

18. The folio of claim 13, wherein the first segment is removably coupled to the second segment such that the first segment is replaceable with a second portable electronic device carrying a second display assembly.

19. The folio of claim 13, wherein the third segment further comprises a first sub- segment and a second sub-segment that is rotatable relative to the first sub-segment, and wherein the folio is configurable to a clipboard configuration, the clipboard configuration comprising (i) the second sub-segment is folded onto the first sub-segment and the second segment, and (ii) the first sub-segment and second segment are folded over the first segment.

20. The folio of claim 13, wherein a transparent protective layer of the portable electronic device is fully covered by the first segment in the closed configuration.

* * * * *